US012455971B2

(12) United States Patent
Leblanc et al.

(10) Patent No.: US 12,455,971 B2
(45) Date of Patent: Oct. 28, 2025

(54) APPLICATION GROUPS FOR ENFORCING DATA TRANSFER CONTROLS

(71) Applicant: GOOGLE LLC, Mountain View, CA (US)

(72) Inventors: Philippe Leblanc, McMasterville (CA); Kiran Nair, San Jose, CA (US); Anthony Vallée-Dubois, Montreal (CA)

(73) Assignee: GOOGLE LLC, Mountain View, CA (US)

( * ) Notice: Subject to any disclaimer, the term of this patent is extended or adjusted under 35 U.S.C. 154(b) by 271 days.

(21) Appl. No.: 18/064,089

(22) Filed: Dec. 9, 2022

(65) Prior Publication Data
US 2023/0205897 A1 Jun. 29, 2023

Related U.S. Application Data

(60) Provisional application No. 63/266,142, filed on Dec. 29, 2021.

(51) Int. Cl.
*G06F 21/60* (2013.01)

(52) U.S. Cl.
CPC ................... *G06F 21/602* (2013.01)

(58) Field of Classification Search
CPC .............................................. G06F 21/60–62
See application file for complete search history.

(56) References Cited

U.S. PATENT DOCUMENTS

| 8,341,734 | B1* | 12/2012 | Hernacki | G06F 16/24 |
| | | | | 380/243 |
| 8,950,005 | B1* | 2/2015 | Torney | H04L 63/101 |
| | | | | 713/193 |
| 10,255,446 | B2* | 4/2019 | Brooks | G06F 21/606 |
| 10,613,897 | B1* | 4/2020 | Wang | G06F 9/4843 |
| 11,606,689 | B1* | 3/2023 | Mhaske | H04W 12/068 |
| 2014/0032733 | A1* | 1/2014 | Barton | G06F 21/6218 |
| | | | | 709/223 |
| 2014/0173700 | A1* | 6/2014 | Awan | H04W 12/02 |
| | | | | 726/4 |

(Continued)

FOREIGN PATENT DOCUMENTS

EP 3422237 A1 1/2019

OTHER PUBLICATIONS

Invitation to Pay Addititional Fees for PCT Application No. PCT/US2022/081359, mailed on Apr. 18, 2023, 11 pages.

(Continued)

*Primary Examiner* — Jonathan A Bui
(74) *Attorney, Agent, or Firm* — Brake Hughes Bellermann LLP

(57) ABSTRACT

According to an aspect, a method may include obtaining data loss prevention (DLP) restriction data, the DLP restriction data identifying a group resource identifier and a restriction to a computer function of a computing device associated with an organization, detecting a data transfer event for transferring data from a first application to a second application, identifying a group of applications using the group resource identifier, and applying the restriction to the computer function when the first application is identified as belonging to the group of applications and the second application is identified as not belonging to the group of applications.

11 Claims, 18 Drawing Sheets

(56) References Cited

U.S. PATENT DOCUMENTS

2016/0212133 A1\* 7/2016 Chenard ............... H04L 63/20
2017/0262236 A1\* 9/2017 Sarin ..................... G06F 3/1246
2019/0340376 A1 11/2019 Fleck et al.
2021/0397735 A1 12/2021 Samatov et al.

OTHER PUBLICATIONS

International Search Report and Written Opinion for PCT Application No. PCT/US2022/081359, mailed on Jun. 12, 2023, 16 pages.

\* cited by examiner

APPLICATION GROUPS FOR ENFORCING DATA TRANSFER CONTROLS

CROSS-REFERENCE TO RELATED APPLICATION

This application claims priority to Provisional Patent Application No. 63/266,142, filed Dec. 29, 2021, the entire contents of which are hereby incorporated by reference in its entirety.

BACKGROUND

Data loss prevention (DLP) software may be executed by a particular application, website, and/or third party system to minimize data leakage incidents. For example, a video conference application that has DLP functionality may detect restricted material and prevent an action taken with respect to the restricted material, e.g., blocking a person from sharing that restricted material in a chat section or in a channel with external users. A computing device associated with or managed by an organization may have a wide variety of applications such as workspace applications (e.g., email, word processing app, storage, calendar, etc.), video/messaging applications, productivity applications, social media applications, and a variety of personal/enterprise applications. Conventionally, an administrator may manually curate allow/block lists to restrict the transfer of data. However, as the number of applications increase, the amount and/or complexity of configuring DLP rules for individual applications may also increase, which can decrease the security of the computing device.

SUMMARY

This disclosure relates to a data loss prevention (DLP) system configured to enable an administrator to create one or more application groups, where each application group identifies one or more applications and each application group is identifiable by a group resource identifier. Each application group defines a data transfer perimeter to allow administrators to control the transfer of data within a particular application group and control the transfer of data out of (or into) a particular application group.

According to an aspect, a method may include obtaining data loss prevention (DLP) restriction data, the DLP restriction data identifying a group resource identifier and a restriction to a computer function of a computing device associated with an organization, detecting a data transfer event for transferring data from a first application to a second application, identifying a group of applications using the group resource identifier, and applying the restriction to the computer function when the first application is identified as belonging to the group of applications and the second application is identified as not belonging to the group of applications.

According to an aspect, an apparatus comprising at least one processor and a non-transitory computer readable medium storing executable instructions that when executed by the at least one processor cause the at least one processor to obtain data loss prevention (DLP) restriction data, the DLP restriction data identifying a first group resource identifier, a second group resource identifier, and a restriction to a computer function of a computing device associated with an organization, detect a data transfer event for transferring data from a first application to a second application, identify a first group of applications using the first group resource identifier, identify a second group of applications using the second group resource identifier, and apply the restriction to the computer function in response to the first application being identified as belonging to the first group of applications and the second application being identified as belonging to the second group of applications.

According to an aspect, a non-transitory computer-readable medium stores executable instructions that, when executed by at least one processor, cause the least one processor to execute operations. The operations include obtaining data loss prevention (DLP) restriction data, the DLP restriction data identifying a group resource identifier and a restriction to a computer function of a computing device associated with an organization, detecting a data transfer event for transferring data from a first application to a second application, identifying a group of applications using the group resource identifier, and applying the restriction to the computer function when the first application is identified as belonging to the group of applications and the second application is identified as not belonging to the group of applications. The operations may include detecting a copy request from the first application, encrypting the data using an encryption key, storing the encryption key in a memory device, and generating clipboard data including an encryption key identifier and the encrypted data. The operations may include detecting a paste request from the second application and rendering a user interface (UI) object indicating that a clipboard function is blocked for transferring the data from the first application to the second application. The group resource identifier includes a resource locator pattern.

In some examples, an apparatus includes at least one processor and a non-transitory computer readable medium storing executable instructions that when executed by the at least one processor cause the at least one processor to obtain data loss prevention (DLP) restriction data, the DLP restriction data identifying a group resource identifier and a restriction to a computer function of a computing device associated with an organization, detect a data transfer event for transferring data from a first application to a second application, identify a group of applications using the group resource identifier, and determine whether to apply the restriction to the computer function based on whether i) the first application is identified as belonging to the group of applications and the second application is identified as not belonging to the group of applications or ii) the first application and the second application are identified as belonging to the group of applications. In some examples, a method and/or computer-readable medium product is provided having the operations discussed above.

The details of one or more implementations are set forth in the accompanying drawings and the description below. Other features will be apparent from the description and drawings, and from the claims.

DETAILED DESCRIPTION

Figure 1A:
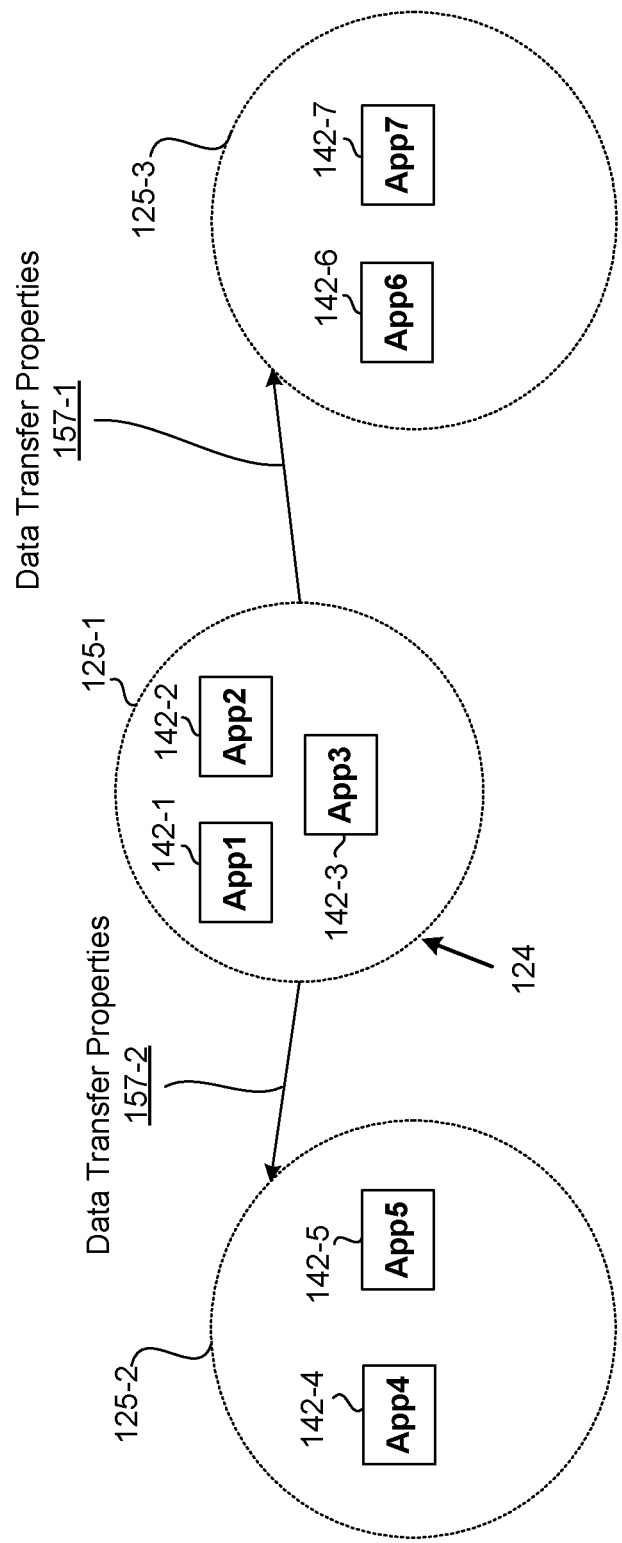
FIG. 1A illustrates an example of application groups according to an aspect.

This disclosure relates to a data loss prevention (DLP) system that provides a technical solution of creating one or more application groups, where each application group identifies one or more applications and each application group is identifiable by a group resource identifier. Each application group defines a data transfer perimeter to allow administrators to control the transfer of data within a particular application group and control the transfer of data out of (or into) a particular application group. The DLP system provides the technical benefits of increasing the enforcing data transfer controls, reducing unsanctioned data flow across the data transfer perimeter, and/or the ability to enforce additional protections to applications within a particular application group. In addition, the DLP system provides the technical benefits of reducing the complexity of configuring DLP restrictions across a wide variety of applications through the use of the group resource identifier, which can be used within DLP controls to apply data transfer restrictions to the application group as a whole without having to manually configure each application. In addition, the technical benefits may include reduced complexity and/or reduced resource usage within the groups (e.g., data transfers may be allowed within a particular group which may avoid DLP control checking and restrictions for data transfer requests of the group).

Each application group is associated with data transfer properties that define data transfer control for data being transferred out of (and/or into) the application group and/or data transfer control for data being transferred within applications of a particular application group. The data transfer properties may define restrictions to computer functions such as file downloading/uploading, clipboard functions (e.g., copy, cut, paste), printing, and/or functions relating to screenshots, screencasts, and/or electronic privacy filters, etc. A computer function may be an action (e.g., transfer, capture, duplication, storage, or display, etc.) executed by a computer on data that can be displayed in a user interface. In some examples, the data transfer properties may indicate that data can be freely transferred between applications of a particular application group, but data transfer is restricted (e.g., blocked, warned, reported, scanned, etc.) when transferring data from an application within the application group to an application outside the application group (or to a particular application group). In some examples, the data transfer properties may enable clipboard functions for data being transferred within applications of a particular group but disable the clipboard functions for data being transferred to an application outside a particular application group (or to a particular application group).

The creation of an application group creates a data transfer perimeter, which is a virtual boundary containing one or more applications. In some examples, the application group is defined by a plurality of application identifiers, where each application identifier uniquely identifies a particular application. In some examples, the application identifiers are uniform resource locators (URLs). However, the application identifiers may be any type of identifier that can uniquely identify the applications, such as an executable file name or other identifier. The DLP system generates a group resource identifier that identifies the application group. In some examples, the group resource identifier is a URL pattern. In some examples, the group resource identifier can be interchangeable with the application identifiers. For instance, a group can contain another group identifier as one of its constituents. In other words, an application group may include a list of one or more application identifiers, and one or more of the application identifiers may be another group resource identifier. The group resource identifier may be used within one or more DLP controls.

The administrator may define one or more DLP controls that may cause a computing device to report, restrict, modify, and/or block certain computer functions to be taken with respect to controlled content that is subject to a data transfer event. After the DLP controls are defined, the DLP controls may be transmitted, e.g., via server computer, (e.g., uploaded) to one or more computing devices that are associated with an organization so that they can be implemented at each computing device. For instance, the DLP controls may be transmitted (e.g., uploaded) to a server computer and then transmitted (e.g., downloaded) to the computing device(s). Transmission (e.g., downloading) to a computing device may ensure that the DLP controls can be applied even when the device is offline. In addition, one or more of the DLP controls can be updated and these updates can be propagated to the individual computing devices in a relatively fast manner, so that changes to the DLP controls are quickly implemented at a local level, which can increase the security of the computing devices. In some examples, the DLP controls may not be transmitted (e.g., downloaded) to the computing devices (e.g., a DLP control is pre-configured on a computing device).

The DLP control may define source and/or destination locations, a computer function (e.g., file downloading, file uploading, copying, pasting, screen capturing, printing, etc.), and a restriction to the computer function (e.g., blocking, reporting, warning, scanning, editing, etc.). On the computing device, an enforcement engine may detect a data transfer event to transfer data from a source location to a destination location. If the source location identified by the data transfer event matches the source location in the DLP control, the enforcement engine may enable the restriction to the specified computer function.

The DLP control may specify the group resource identifier of a respective application group. In some examples, the enforcement engine may apply the data transfer restriction when the source location is an application that belongs to the application group identified by the group resource identifier and the destination location is an application that is not part of the application group. For example, the enforcement engine may use the group resource identifier to identify which applications are part of the application group. In some examples, the group resource identifier is a URL pattern, and the enforcement engine uses the URL pattern to obtain the application identifiers that are part of the application group. If the source location of the data transfer event corresponds to one of the application identifiers, the enforcement engine may enable the specified restriction.

The DLP system may provide technical benefits of simplifying extension and permission management. For example, the application group may include extension data that defines which extensions are allowed (or not allowed) to be installed with respect to applications of a respective application group. In some examples, the application group is not associated with extension data, but rather a DLP policy may define restrictions to extensions and refer to one or more application groups by their group resource identifiers. Also, the application group may include permission data that defines which device permissions are allowed (or not allowed) with respect to applications of a respective application. Instead of configuring which extensions and/or device permissions are allowable (or not allowable) with respect to an individual application, the management of extensions and device permissions are simplified through the use of application groups.

In some examples, the enforcement engine is executed by a web browser, but some clipboard functions may be executed by a component on the operating system. As such, in some examples, a system may encounter a technical problem of enforcing a restriction to a computer function that is executed by a web browser and one or more components (e.g., a clipboard manager, a window manager, etc.) on the operating system. Furthermore, when a copy request is detected, the destination location is not yet known, so it is unclear whether that content would be restricted from being transferred. The DLP system provides a technical solution in which clipboard data is encrypted in response to detection of a copy request from a first application and stores the encryption key in a memory device. The clipboard data is transferred to a computer clipboard of the operating system, where clipboard data includes encrypted content, the source location, which may identify the first application, and an encryption key identifier that enables retrieval of the encryption key from the memory device. For instance, the encryption key identifier may identify the location of the encryption key. Upon detection of a paste request, the enforcement engine can detect the destination location (a second application) and determine, e.g., based on the source location, the destination location and a stored DLP control, whether the restriction to the clipboard function is disabled/enabled. If enabled, the enforcement engine may retrieve the encryption key from the memory device using the encryption key identifier, decrypt the encrypted content, where the content is transferred to the second application.

FIGS. 1A through 1I illustrate an example data loss prevention (DLP) system 100 according to an aspect. The DLP system 100 can define one or more application groups 125, where each application group 125 identifies one or more applications 142 and each application group 125 is identifiable by a group resource identifier 113. Each application group 125 may represent a data transfer perimeter to allow administrators to control the transfer of data within a particular application group 125 and control the transfer of data out of (or into) a particular application group 125.

The DLP system 100 includes a computing device 132 associated with an administrator of an organization in which the administrator can define or select application groups 125, one or more DLP controls 118, and device identification data 120 that identifies which computing devices 152 are subject to the DLP controls 118. The DLP system 100 includes a server computer 102 having a DLP engine 114 configured to receive and store the application groups 125, the DLP controls 118, and the device identification data 120 on the server computer 102. The DLP system 100 includes one or more computing devices 152 (associated with the organization) configured to receive the DLP controls 118 (and, in some examples, information from the application groups 125) from the DLP engine 114. The computing device 152 includes an enforcement engine 130 configured to implement the DLP controls 118 while the user is using the computing device 152 to control the transfer of data within a particular application group 125 and control the transfer of data out of (or into) a particular application group 125.

The computing device 132 is configured to execute (at least partially) a DLP application 135 that renders a DLP interface 127 to define the application groups 125, the DLP control(s) 118, and/or the device identification data 120 that identifies which computing devices 152 are subject to the data transfer restrictions defined by the DLP controls 118 and/or the application groups 125. In some examples, the DLP application 135 is a web application executable (at least in part) by a web browser to render the DLP interface 127. In some examples, the DLP application 135 is a native application installed and executed by an operating system of the computing device 132.

Figure 1B:
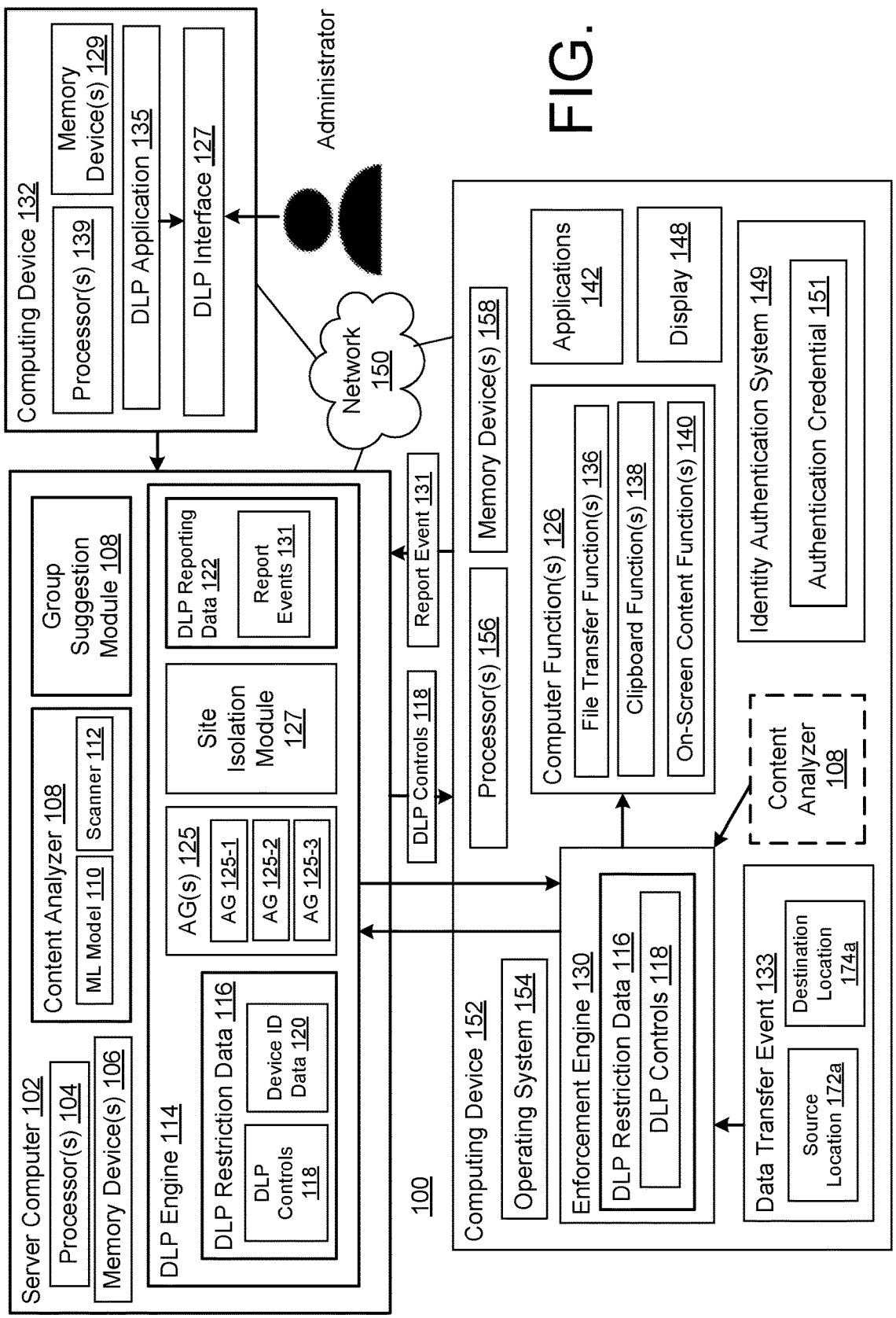
FIG. 1B illustrates a data loss prevention system for data transfer control within and/or across application groups for managed computing devices associated with an organization according to an aspect.
Figure 1C:
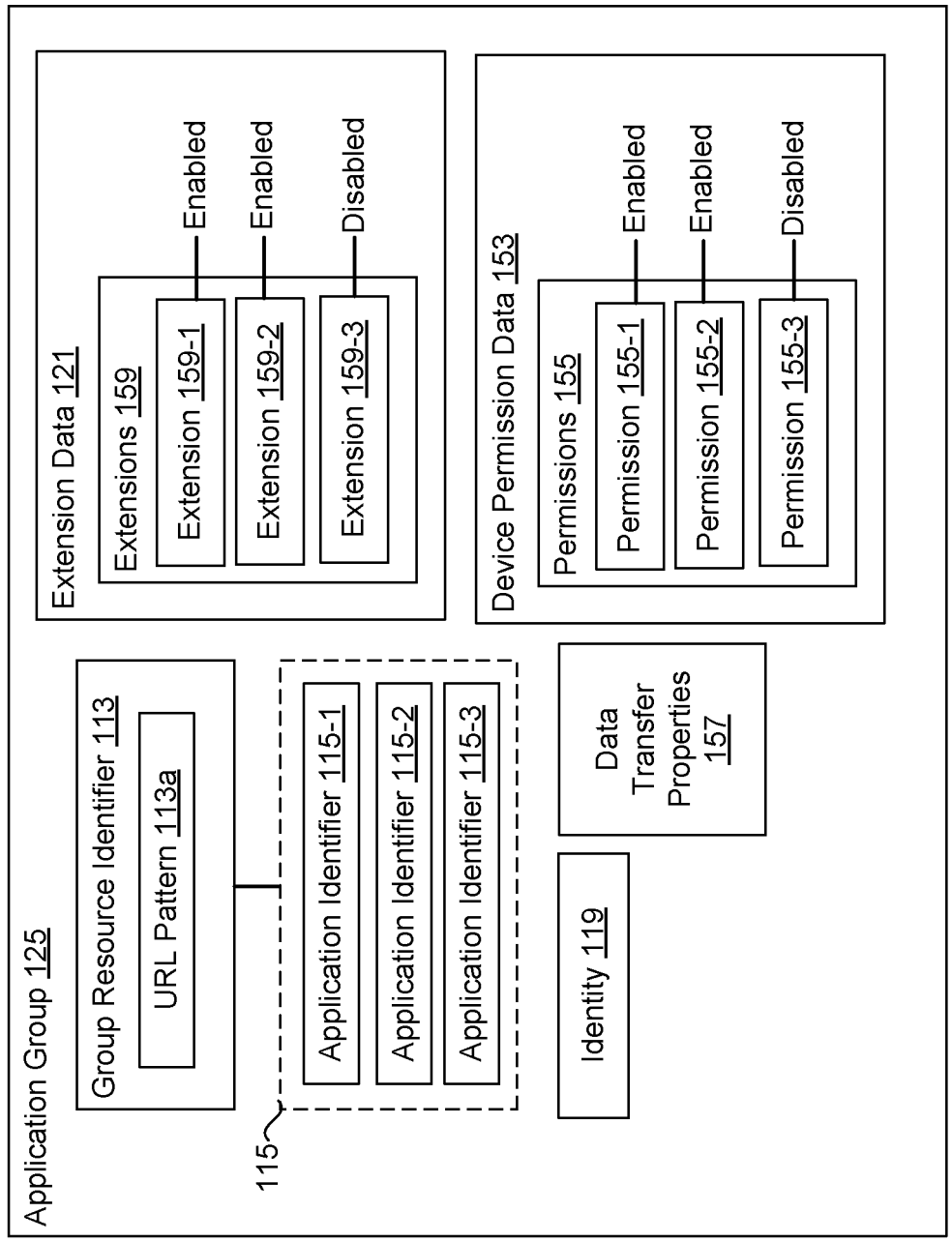
FIG. 1C illustrates an example of an application group according to an aspect.

An application group 125 may identify one or more applications 142 that may be executable by computing devices 152 associated with the organization. For instance, the computing device 152 may be issued, owned, or managed by the organization. As shown in FIGS. 1A and 1C, the application groups 125 may include an application group 125-1, an application group 125-2, and an application group 125-3. However, the administrator may define one, two, three, or more than three application groups 125. The administrator may group certain applications according to one or more common attributes (e.g., trusted applications 142 in one application group 125, enterprise applications 142 in another application group 125, personal applications 142 in another application group 125, etc.).

Each application group 125 may identify two or more applications 142. As shown in FIG. 1A, the application group 125-1 may identify application 142-1, application 142-2, and application 142-3. In some examples, the application group 125-1 may include a group of applications that relate to a workspace product suite such as an email application, a word processing application, a spreadsheet application, a calendar application, a storage system (e.g., an online (cloud) storage system). The application group 125-2 may identify application 142-4 and application 142-5. In some examples, the application group 125-2 may include a group of applications that relate to enterprise applications such a customer relationship management (CRM) application and other enterprise applications used by users of the organization. The application group 125-3 may identify application 142-6 and application 142-7. In some examples, the application group 125-3 may include a group of applications that have a higher security risk (e.g., personal application, open-web applications, etc.).

The applications 142 of a particular application group 125 may be defined by application identifiers 115 of the applications 142, as shown in FIG. 1C. In other words, an application group 125 may include a collection of application identifiers 115. As shown in FIG. 1C, the application group 125 may be defined by an application identifier 115-1, an application identifier 115-2, and an application identifier 115-3. Although three application identifiers 115 are depicted in FIG. 1C, the application group 125 may include one application identifier 115, two application identifiers 115 or any number greater than two. An application identifier 115 may be an identifier that uniquely identifies a particular application 142. In some examples, the application identifier 115 identifies the location of the application 142. In some examples, the application identifier 115 is a series of values that can uniquely identify a particular application 142. In some examples, an application identifier 115 is a URL pattern and/or a URI pattern. In some examples, an application identifier 115 of an application group 125 identifies another application group 125 (e.g., a group nested within a group). In some examples, the nested group inherits the parent group's restrictions.

The applications 142 may include any type of application that is configured to be executable (at least in part) by the computing device 152. The applications 142 may include one or more browser applications. A browser application is a web browser configured to access information on the Internet. The browser application may launch one or more browser tabs in the context of one or more browser windows on a display 148 of the computing device 152. The applications 142 include one or more web applications. A web application may be an application program that is stored on a remote server (e.g., a web server) and delivered over the network 150 through the browser application (e.g., a browser tab). In some examples, the web application is a progressive web application, which can be stored (at least in part) on the computing device 152 and used offline. The applications 142 may include one or more non-web applications (e.g., non-browser applications), which may be programs that are at least partially stored (e.g., stored locally) on the computing device 152 and/or executable by an operating system 154 of the computing device 152. In some examples, the non-web applications may be executable by (or running on top of) the operating system 154.

The applications 142 may include one or more native applications. In some examples, a native application is a non-web application. A native application is a software program that is developed for use on a particular platform or device, or for a particular operating system. In some examples, the native application is a software program that is developed for multiple platforms or devices. In some examples, the native application is a software program developed for use on a mobile platform and/or configured to execute on a desktop or laptop computer. In some examples, the applications 142 may include one or more mobile applications. A mobile application is a native application configured to execute on a mobile operating system of a mobile computing device such as a smartphone or a tablet. In some examples, the mobile applications can execute on a larger device such as a laptop or desktop computer. In some examples, the mobile applications may include an Android application, a mobile iOS application, and/or a mobile Windows application configured to execute on a mobile and/or desktop operating system. In some examples, the applications 142 may include one or more Linux applications (e.g., Linux applications in a virtualized environment).

In some examples, the application identifiers 115 of a respective application group 125 correspond to web applications (each identifiable by a different, unique URL pattern, including URI patterns). In some examples, the application identifiers 115 of a respective application group 125 correspond to one or more of native applications, which may include applications designed for a mobile operating system, applications designed for a desktop operating system, and/or application designed for a mobile and desktop operating systems.

As shown in FIG. 1C, an application group 125 is associated with a group resource identifier 113. The group resource identifier 113 is an identifier that can uniquely identify a particular application group 125. The enforcement engine 130 and/or the DLP engine 114 can use the group resource identifier 113 to quickly identify the application identifiers 115 of the respective application group 125 and obtain information associated with the respective application group 125 (e.g., an identity 119 associated with the application group 125, data transfer properties 157, extension data 121, device permission data 153, etc.). In some examples, the group resource identifier 113 includes a URL pattern 113a. The URL pattern 113a may be a URL that is different from any of the URL patterns associated with the applications 142. In some examples, the DLP engine 114 generates the group resource identifier 113 in response to receipt of the application identifiers 115. In some examples, an administrator can add (or delete) application identifiers 115 so that applications 142 can easily be incorporated (or removed) into/from the group's data transfer boundary (without configuring/de-configuring the data transfer restrictions of an individual application 142).

Each application group 125 may define one or more data transfer properties 157 on the transfer of data within, from, and/or to the application group 125. The data transfer properties 157 may be defined by the administrator using the computing device 132. In some examples, the data transfer properties 157 (or a portion thereof) are defined within the DLP controls 118. The data transfer properties 157 may indicate that data can be transferred among the applications 142 of a particular application group 125. In some examples, the data transfer properties 157 may indicate that data transfer is restricted (e.g., blocked, warned, reported, subject to scanning, etc.) among the applications 142 of a particular application group 125. In some examples, the data transfer properties 157 may indicate that data transfer is restricted between one application group 125 to another application group 125.

Referring to FIG. 1A, the application group 125-1 may include data transfer properties 157-1 that prevent the transfer of data from the application group 125-1 to the application group 125-3. For example, data from any of application 142-1, application 142-2, or application 142-3 is blocked from being transferred to application 142-6 or application 142-7. In some examples, the application group 125-1 may include data transfer properties 157-2 that provide a warning to the user (but allowable) when transferring data from the application group 125-1 to the application group 125-2.

Referring to FIG. 1C, an administrator may specify whether an identity 119 is associated with the application group 125. The identity 119 may be identification information that identifies a person or role of person or a group/class/department within the organization. If an identity 119 is associated with the application group 125, the identity 119 is part of a managed domain of the organization. For example, the identity 119 is an identifier that is also included as part of the managed domain of the organization. The managed domain of the organization includes the users that are authorized as part of the organization. If the identity 119 is associated with the application group 125, the data transfer restrictions may change depending on whether an authentication credential 151 of the user of the computing device 152 corresponds to the identity 119 specified by the application group 125.

The computing device 152 may include or communicatively connected to an identity authentication system 149 that can authenticate a user of the computing device 152 (e.g., using a password, biometric, digital certificate, etc.), such as when the user of the computing device 152 logs into the computing device 152. In some examples, the identity authentication system 149 is included on the operating system 154 of the computing device 152. In some examples, the identity authentication system 149 (or a portion thereof) is not executable by the computing device 152, but the computing device 152 communicates with the identity authentication system 149 over the network 150.

The authentication credential 151, when authenticated by the identity authentication system 149, is compared to the identity 119 identified by the application group 125. If the authentication credential 151 of the user corresponds to the identity 119, the data transfer properties 157-2 may indicate to provide a warning to the user (but allow the transfer) when transferring data from the application group 125-1 to the application group 125-2. If the authentication credential 151 of the user does not corresponds to the identity 119 (which may mean that the user has logged into the computing device 152 using their personal account as opposed to their work account), the data transfer properties 157-2 may indicate to block the transfer of data from the application group 125-1 to the application group 125-2.

Referring to FIG. 1C, the application group 125 may include extension data 121 that defines which extensions 159 are enabled (or disabled) with respect to applications 142 of a respective application group 125. If an extension 159 is added to an application 142, the extension 159 adds a feature or function to the application 142. In some examples, an extension 159 may be HTML, CSS, and/or JavaScript based (for browser-based extensions). In some examples, an extension 159 is a web browser extension. In some examples, the extension 159 is an add-in for a native application. In some examples, an extension 159 is a web application. As shown in FIG. 1B, the extension data 121 may identify extension 159-1, extension 159-2, and extension 159-3 and the extension data 121 may indicate whether or not the extensions 159 are enabled or disabled with respect to the applications 142 of a particular application group 125. A user may be able to add extension 159-1 and extension 159-2 to any of applications 142 of the application group 125 but the user is prevented from adding extension 159-3 to any of the applications 142 of the application group 125. In some examples, the extension data 121 may indicate that only certain extensions 159 are enabled. In some examples, the extension data 121 may indicate that only certain extensions 159 are disabled.

Referring to FIG. 1C, the application group 125 may include device permission data 153 that defines which device permissions 155 are enabled or disabled with respect to applications 142 of a respective application group 125. A device permission 155, if enabled, allows access to a specific system or device function of the computing device 152. A device permission 155, if disabled, blocks a specific system or device function of the computing device 152. The device permissions 155 may include a wide range of permissions such as access to storage and personal information such as contacts, calendar appointments, etc., location tracking, access to the device's internal camera and/or microphone, access to biometric sensors, access to communication interfaces (e.g., Bluetooth, Wi-Fi, near-field communication (NFC), placing/receiving phone calls, transmitting/receiving text messages, etc.

As shown in FIG. 1C, the device permission data 153 may identify permission 155-1, permission 155-2, and permission 155-3 and may indicate whether the device permissions 155 are enabled or disabled. The device permission data 153 may indicate whether or not each device permission 155 is enabled or disabled. A user can accept permission 155-1 or permission 155-2 for any of applications 142 of the application group 125 but the user is prevented from accepting permission 155-3 for any of the applications 142 of the application group 125. In some examples, the device permission data 153 may indicate that only certain device permissions 155 are enabled. In some examples, the device permission data 153 may indicate that only certain device permissions 155 are disabled. Instead of configuring which extensions 159 and/or device permissions 155 are enabled/disabled with respect to an individual application 142, the management of extensions 159 and device permissions 155 are simplified through the use of application groups 125.

Referring back to FIG. 1B, the DLP engine 114 may receive DLP restriction data 116 from the computing device 132, where the DLP restriction data 116 includes the DLP controls 118 and the device identification data 120. In some examples, the DLP restriction data 116 includes information from the application groups 125. The DLP engine 114 stores the DLP controls 118, the device identification data 120, and the application groups 125 in a memory device 106 associated with the server computer 102. The DLP engine 114 may transmit, over the network 150, the DLP controls 118 to the computing devices 152 that are identified by the device identification data 120. In some examples, the DLP engine 114 may transmit information about the application groups 125 to the computing devices 152 that are identified by the device identification data 120.

The enforcement engine 130 on the computing device 152 is configured to receive, over the network 150, the DLP restriction data 116 from the DLP engine 114 on the server computer 102, where the DLP restriction data 116 includes the DLP control(s) 118. In some examples, the enforcement engine 130 receives information associated with the application groups 125 from the DLP engine 114. In some examples, the DLP restriction data 116 includes the data transfer properties 157 of the application groups 125 and the restrictions on the extensions 159 and device permissions 155. In some examples, the data transfer properties 157 are defined as part of one or more DLP controls 118. In some examples, the enforcement engine 130 is executable by a web browser application (e.g., one of the applications 142). In some examples, the enforcement engine 130 is executable by the operating system 154.

The enforcement engine 130 may store the DLP controls 118 on a memory device 158 associated with the computing device 152. In some examples, the enforcement engine 130 stores the application groups 125 in the memory device 158 associated with the computing device 152. The DLP engine 114 may receive and store the DLP control(s) 118 and/or the application groups 125 in response to the user and/or the administrator accepting, joining, or registering with the DLP system 100. In some examples, the user may be required to consent to the user of the DLP system 100. In some examples, when the administrator identifies the computing device 152 within the DLP restriction data 116 and the DLP restriction data 116 is received and stored on the server computer 102, the DLP controls 118 are set to be delivered to the computing device 152. In some examples, the computing device 152 is pre-configured with the DLP control(s) 118 and/or the application groups 125. For example, a user may be assigned or issued the computing device 152 with the DLP control(s) 118 and/or the application groups 125 already stored in the memory device 158. In some examples, in response to the computing device 152 being activated (e.g., turned-on) and connected to the network 150, the enforcement engine 130 is configured to communicate with the DLP engine 114 to obtain the DLP controls 118 and/or the application groups 125 and/or obtain any updates to the DLP controls 118 and/or the application groups 125.

Figure 1D:
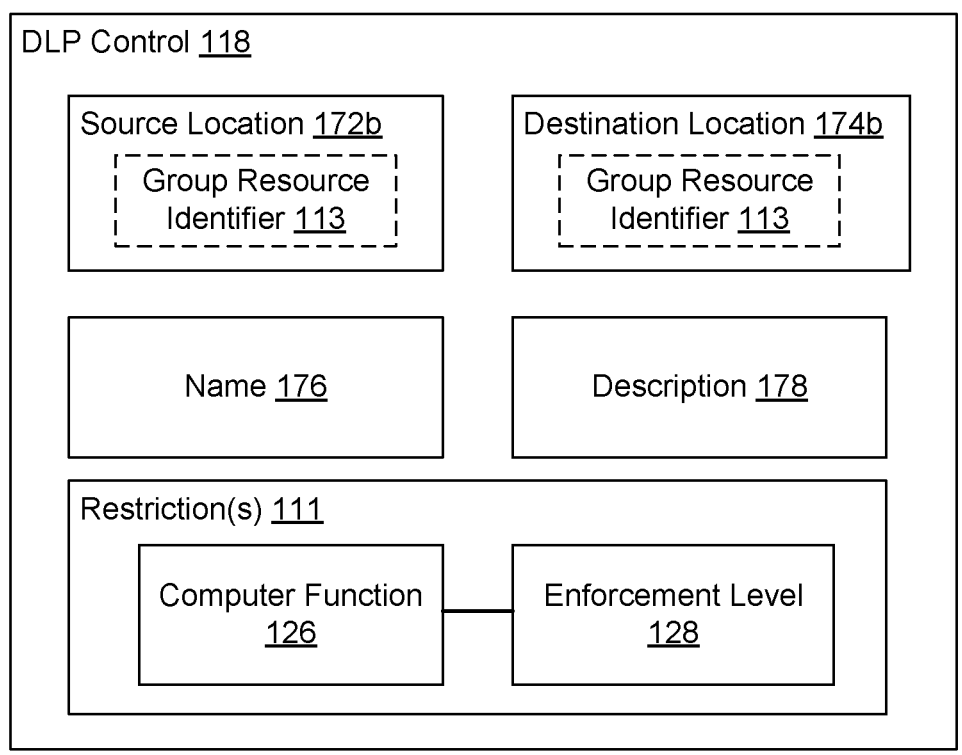
FIG. 1D illustrates an example of a data loss prevention (DLP) control that is implemented by a managed computing device according to an aspect.

As shown in FIG. 1D, a DLP control 118 may define a source location 172b, a destination location 174b, a name 176, a description 178, and one or more restrictions 111. Each restriction 111 may identify a computer function 126 and a corresponding enforcement level 128 (e.g., reported, warned, data scan trigger, modify, and/or blocked). The enforcement level 128 specifies the level of restriction applied to the computer function 126. The source location 172b identifies a source of controlled content, which may be the group resource identifier 113. In some examples, if a source location 172a of a data transfer event 133 (detected by the enforcement engine 130) corresponds to the source location 172b of the DLP control 118, the computer function 126 is restricted as identified by the enforcement level 128. In some examples, if a source location 172b and a destination location 174b of a data transfer event 133 match the source location 172b and the destination location 174b, respectively, of the DLP control 118, the data is restricted from being transferred.

The source location 172b may be one or more application identifiers 115 or one or more group resource identifiers 113. If an application identifier 115 is specified in the source location 172b of the DLP control 118, content from the corresponding application 142 is considered controlled. The restriction 111 to the computer function 126 is applied by the enforcement engine 130 when the controlled content is part of a data transfer event 133. If a group resource identifier 113 is specified in the source location 172b of the DLP control 118, content from any of the applications 142 that are part of the application group 125 is considered controlled content, where the restriction 111 to the computer function 126 is applied by the enforcement engine 130 when the controlled content is part of a data transfer event 133.

More generally, the source location 172b may be any type of computer resource, e.g., an application 142, a web resource identified by a web location, a storage device, an operating system (OS) user interface (or component). In some examples, if the source location 172b corresponds to (e.g., matches) a source location 172a of a data transfer event 133, the enforcement engine 130 applies the restriction 111 to the computer function 126. The source location 172a and the source location 172b relate to the same term (so any description applies to both), except the source location 172a is the source of the data subject to the data transfer event 133 and the source location 172b is the identified source in the DLP control 118.

In some examples, the DLP control 118 may not include a destination location 174b. In some examples, the DLP control 118 includes one or more destination locations 174b (e.g., blocked destinations) for one or more given source locations 172b. The destination location 174b may be one or more application identifiers 115 or one or more group resource identifiers 113. If the source location 172b identifies a group resource identifier 113 of the application group 125-1 and the destination location 174b identifies a group resource identifier 113 of the application group 125-2, data transfer is restricted from any of the applications 142 of the application group 125-1 to any of the applications 142 of the application group 125-2. More generally, a destination location 174b may be any type of computer resource, e.g., an application 142, a web resource identified by a web location, storage, an operating system (OS) user interface (or component).

The DLP control 118 may define a name 176. The name 176 may be used to show a notification (e.g., UI object) to the user. In some examples, DLP control 118 may define a description 178. The description 178 may be a short description that describes the computer function 126 that is being restricted. The description 178 may be used to show a notification (e.g., UI object) to the user.

A computer function 126 may be a computer action, initiated by the user, that can be taken with respect to the controlled content (identified by the source location 172b or the source location 172b and the destination location 174b) in which the controlled content can be disseminated to a different location digitally or physically (e.g., displayed, transferred, printed, etc.). The computer functions 126 may include several classes of computer functions such as file transfer functions 136, clipboard functions 138, and/or on-screen content functions 140.

A file transfer function 136 may be the transfer of content from one computer location to another computer location, which may include the downloading and/or uploading of content from and/or to the computing device 152. For example, if the user moves content (e.g., a file) from a managed access point, the organization may lose control on how that content is accessed and shared. A clipboard function 138 may refer to an action of a computer clipboard. A clipboard function 138 may enable the cutting, copying, and pasting of information from one place to another place. A computer clipboard is a temporary location (e.g., buffer) on the operating system 154 of the computing device 152 that temporarily stores cut or copied data. Once data is stored in the clipboard, the data can be pasted to a new location. The computer clipboard may provide an application programming interface by which programs can specify cut, copy, and paste operations. Using the computer clipboard, a user can transfer data within and/or between applications 142 and OS components.

The on-screen content functions 140 may include a screenshot function, a screencast function, a printing function, and/or a display screen function. In some examples, a restriction 111 to the screenshot function may disallow a user to take screenshots if the controlled content (which is defined by the source location 172b) is rendered on the display 148. A screenshot (also referred to as a screen capture or screen grab) is a digital image that shows the content (or a portion thereof) of a display 148. In some examples, a restriction 111 to the screencast function may disallow a user to share/cast their display 148 if the controlled content (which is defined by the source location 172*b*) is rendered on the display 148. A restriction 111 to the printing function may disallow a user to print controlled content (which is defined by the source location 172*b*). A screencast may include the sharing of at least a portion of the content of the display 148 with another display, which may include screen mirroring and/or screen sharing. In some examples, a restriction 111 to a display screen function may trigger the operating system 154 to enable an electronic privacy screen if controlled content (which is defined by the source location 172*b*) is rendered on the display 148.

The enforcement engine 130 may alter the display screen function so that the display 148 is configured as an electronic privacy screen. The alteration of the display screen function may change one or more display aspects of the display 148 so that the controlled content is less visible to people or devices that are around the computing device 152. In some examples, the display screen function reduces the display visibility angle (e.g., the viewing angle) so that information can be viewed on the display 148 from a narrower angle (thereby preventing people from peeking at the user's display 148 when viewing controlled content (e.g., in public). In some examples, the alteration of the display screen function includes the enabling of an electronic privacy screen. In other words, when the display screen function is identified as controlled in the DLP control 118, a filter may be applied to the display 148 so that the display 148 is transformed into an electronic privacy screen, which reduces the viewing angle (and/or reduces the brightness of the display 148).

The enforcement levels 128 may include a report setting, a warn setting, a block setting, and/or a data scan setting. If the report setting is specified for a particular computer function 126, the enforcement engine 130 may transmit, over the network 150, a report event 131 that includes information about the computer function 126 to the DLP engine 114, which is stored as DLP reporting data 122.

Also, it is noted that a user may be provided with controls allowing the user to make an election as to both if and when systems, programs or features described herein may enable collection of user information (e.g., DLP reporting data 122), and if the user is sent content or communications from a server.

If the report setting is specified for a particular computer function 126, the enforcement engine 130 does not restrict the particular computer function 126 (e.g., the user is still allowed to file transfer, print, screencast, screenshot, copy/paste, etc.). If the warn setting is specified for a particular computer function, the enforcement engine 130 may render a UI object that warns the user that the content subject to the particular computer function 126 includes controlled content. In some examples, if the warn setting is specified for a particular computer function 126, the enforcement engine 130 does not restrict the particular computer function 126. In some examples, if the warn setting is specified for a particular computer function 126, the enforcement engine 130 is configured to require receipt of a user gesture taken with respect to the UI object in order to permit execution of the particular computer function 126 (e.g., clicking "ok" to enable printing).

If the block setting is specified for a particular computer function 126, the enforcement engine 130 is configured to disable the particular computer function 126. In some examples, if the data scan setting is specified for a particular computer function 126, the enforcement engine 130 may trigger an analysis of the content subject to the computer function 126 by the content analyzer 108. In some examples, one enforcement level 128 is specified for a particular computer function 126. In some examples, multiple enforcement levels 128 can be specified for a particular computer function 126 (e.g., any combination of the report setting, the warn setting, and the block setting).

The content identifier 108 may be executable by the server computer 102. For example, the computing device 152 may transmit (e.g., upload), over the network 150, the content subject to the computer function 126 to the server computer 102, where the content analyzer 108 at the server computer 102 is configured to determine whether the content includes restricted content. If so, the content analyzer 108 at the server computer 102 is configured to transmit a response to the enforcement engine 130, where the response indicates whether or not the content includes the restricted content. In some examples, the content analyzer 108 is executable by the computing device 152.

The content analyzer 108 may include a text scanner 112 configured to perform a scan of the content to identify whether that content includes the keyword(s). For example, the text scanner 112 may recognize text from a content source (e.g., file, web location, on-screen content, etc.) and determine whether the text includes or is associated with the keyword(s). In some examples, the text scanner 112 is an optical character recognition (OCR) scanner.

The content analyzer 108 may include a machine-learning (ML) model 110 that predicts whether the content is restricted content. In some examples, the content analyzer 108 is configured to execute using an accelerator on the operating system 154. The accelerator may improve the performance of ML models (including the content analyzer 108) that execute on the computing device 152. In some examples, the accelerator includes an application-specific integrated circuit (ASIC) for neural network machine learning. In some examples, the ML model 110 is trained according to one or more ML techniques that is configured to identify restricted content using content as an input. In some examples, the ML model 110 may be trained according to parameters that are established by the organization or the administrator such that the ML model 110 can predict whether the content includes restricted content that is tailored for a particular organization.

Figure 1E:
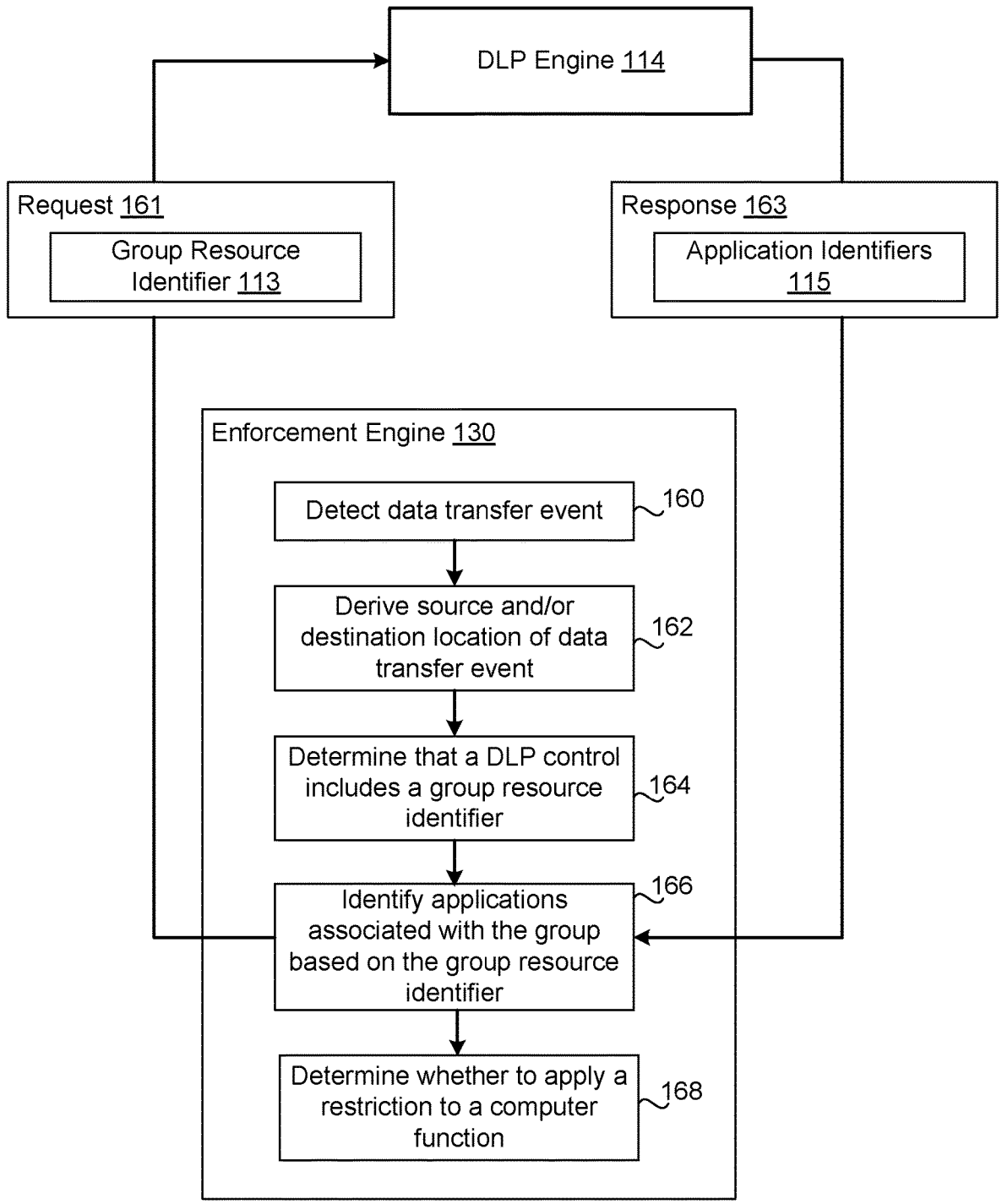
FIG. 1E illustrates example operations of an enforcement engine of a computing device according to an aspect.

FIG. 1E depicts example operations of an enforcement engine 130. In operation 160, the enforcement engine 130 may detect a data transfer event 133. The data transfer event 133 may refer to the transfer to data from one location to another location, e.g., file transfer events (e.g., uploading/downloading), clipboard events (e.g., cut/copy/paste), on-screen detection events (e.g., printing request, screencast event, screenshot event, etc.). In some examples, the data transfer event 133 is generated by one of the applications 142 (e.g., a web browser). In some examples, the data transfer event 133 is generated by the operating system 154. In operation 162, the enforcement engine 130 may derive at least one of a source location 172*a* and a destination location 174*b* from the data transfer event 133.

The enforcement engine 130 may determine whether any of the DLP controls 118 apply to the data transfer event 133 by comparing the source location 172*a* (and, in some examples, the destination location 174*a*) to the source locations 172*b* (and, in some examples, the destination location 174*b*) of the DLP controls 118. In operation 164, the enforcement engine 130 may determine that a DLP control 118 includes a group resource identifier 113. Upon detection of the group source identifier 113, the enforcement engine 130 may identify applications 142 associated with the application group 125 based on the group resource identifier 113. In some examples, the enforcement engine 130 may use the group resource identifier 113 to obtain any information (or a portion thereof) of the information of the application group 125 of FIG. 1B such as the application identifiers 115, the identity 119, the data transfer properties 157, the extension data 121, and/or the device permission data 153.

In some examples, the group resource identifier 113 is a URL pattern, in which the enforcement engine 130 requests a list of application identifiers 115 that are associated with the group resource identifier 113 from the DLP engine 114. In some examples, the enforcement engine 130 may transmit, over the network 150, a request 161 that includes the group resource identifier 113. The DLP engine 114 may derive the application identifiers 115 using the group resource identifier 113, and transmit, over the network 150, a response 163 that includes the application identifiers 115 that are associated with the group resource identifier 113. In some examples, the response 163 may include any of the information discussed with reference to the application group 125 of FIG. 1B. For example, the response 163 may include the data transfer properties 157, the identity 119, the extension data 121, and/or the device permission data 153. In some examples, the application groups 125 are stored on the computing device 152, and the enforcement engine 130 using the group resource identifier 113 to obtain the application identifiers 115, the identity 119, the data transfer properties, the extension data 121, and/or the device permission data 153 from the memory device 158.

In operation 168, the enforcement engine 130 may determine whether to apply the restriction 111 to the computer function 124. In some examples, the enforcement engine 130 may apply the restriction 111 to the computer function 124 when the source location 172a is an application 142 that is part of the application group 125 and the destination location 174a is an application that is not part of the application group 125. For example, the enforcement engine 130 may detect that the source location 172a of the data transfer event 133 corresponds to (e.g., matches) one of the application identifiers 115 of an application group 125. In some examples, the enforcement engine 130 may detect that the destination location 174a does not correspond to one of the application identifiers 115 of the application group 125, where the restriction 111 to the computer function 124 is applied. In some examples, the DLP control 118 identifies a destination location 174b, where the destination location 174b is another group resource identifier 113. The enforcement engine 130 may obtain the list of application identifiers 115 for the other group resource identifier 113, and then determine whether the destination location 174a corresponds to one of the application identifiers 115 for the other group resource identifier 113.

In some examples, the enforcement engine 130 may determine to not apply the restriction 111 to the computer function 124 when the source location 172a is the application 142 that is part of the application group 125 and the destination location 174b is another application that is part of the application. For example, using the list of application identifiers 115, the enforcement engine 130 may determine that the source location 172a includes one of the application identifiers 115 of a particular application group 125 and the source location 172b includes another one of the application identifiers 115 of the particular application group 125, and the enforcement engine 130 may determine to not apply the restriction 111 to the computer function 124.

Figure 1F:
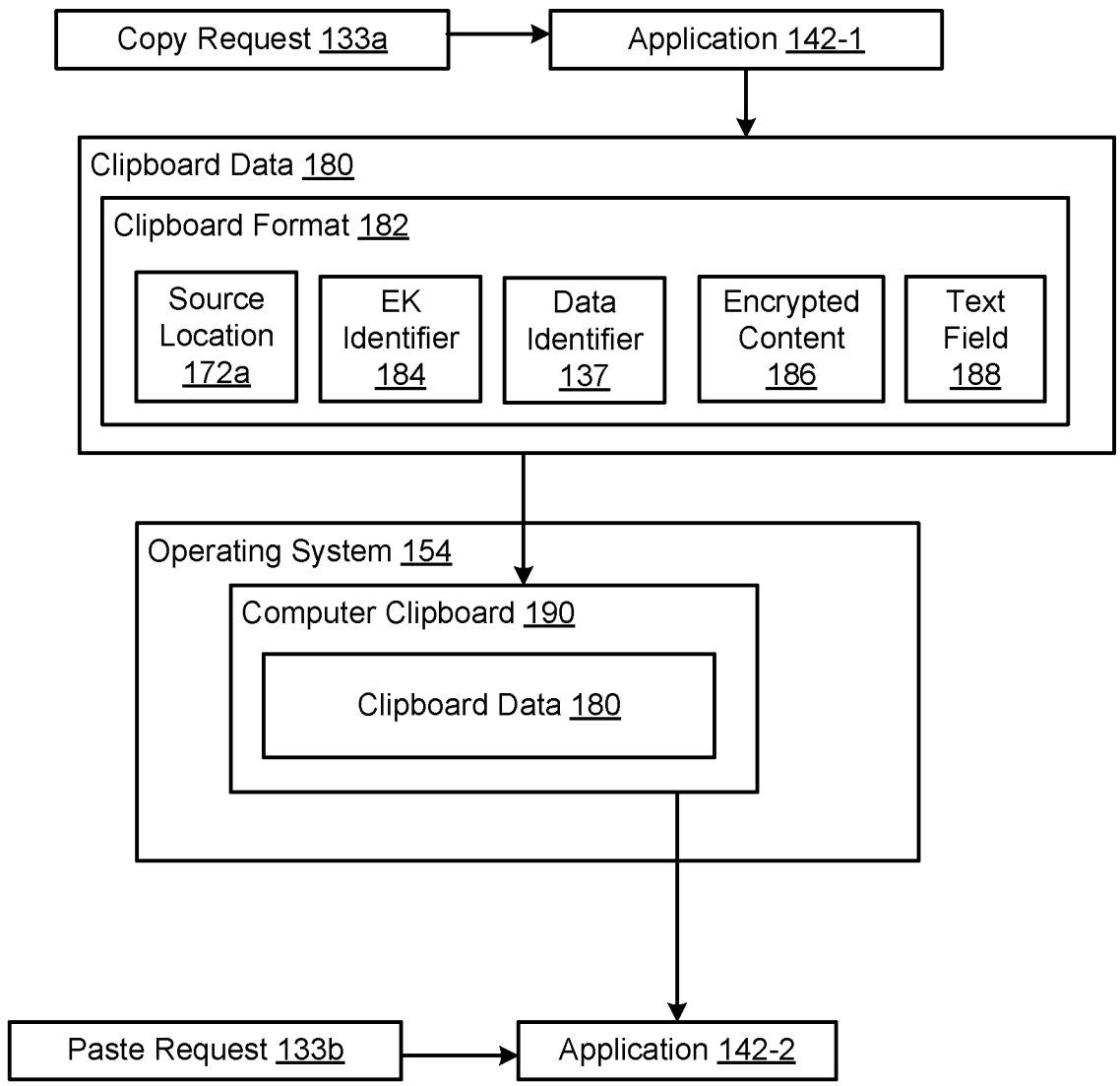
FIG. 1F illustrates an example of clipboard data according to an aspect.
Figure 1G:
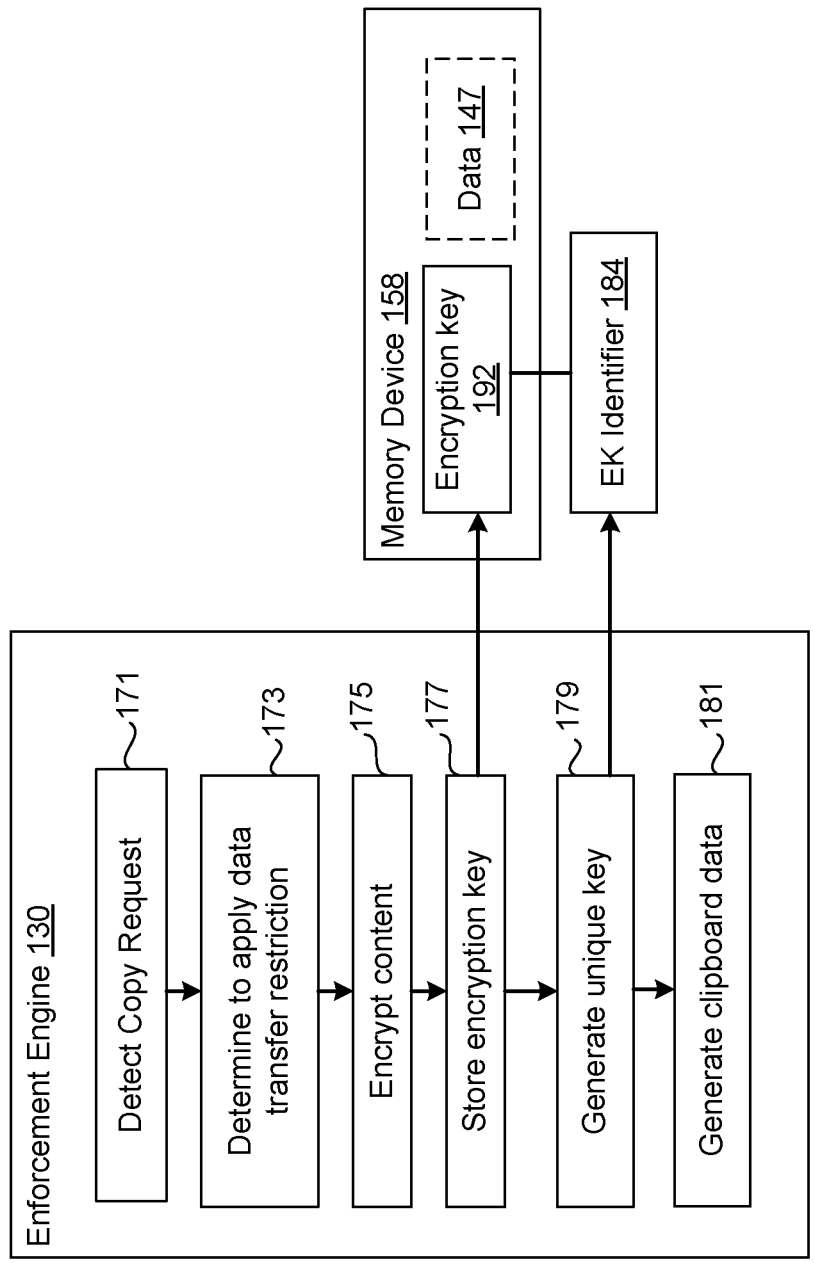
FIG. 1G illustrates example operations of an enforcement engine for a copy request according to an aspect.
Figure 1H:
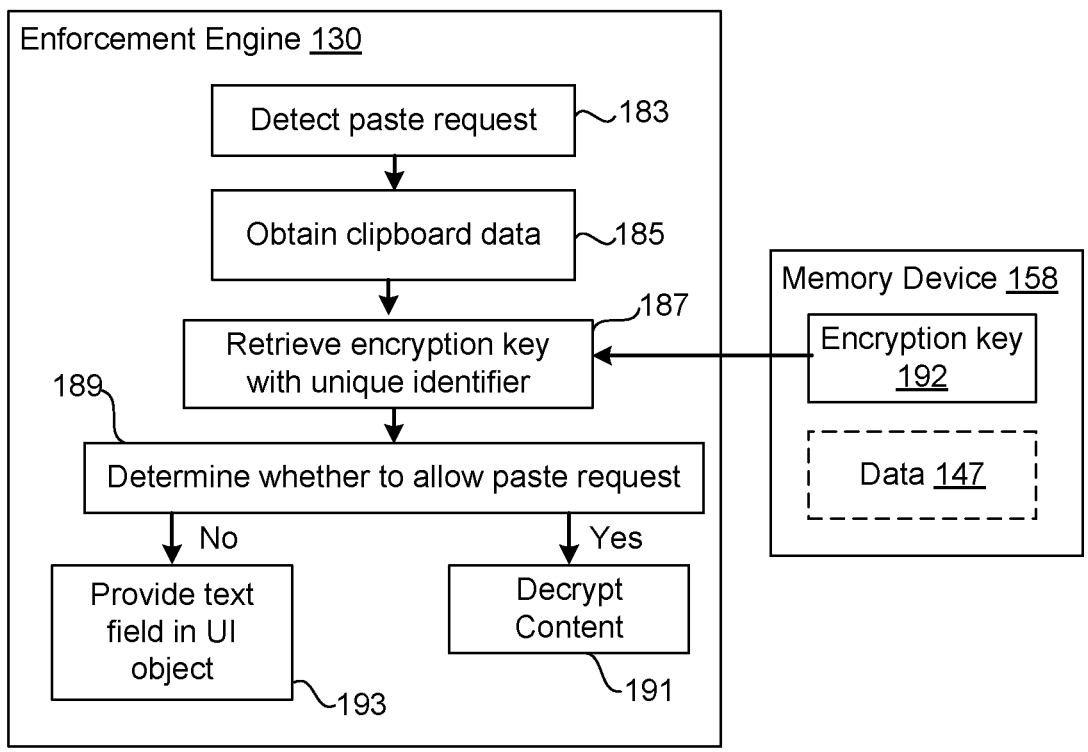
FIG. 1H illustrates example operations of an enforcement engine for a paste request according to an aspect.

FIGS. 1F through 1H illustrate example operations of enforcing a restriction to a clipboard function 138. In some examples, the enforcement engine 130 is executed by a web browser, but some clipboard functions 138 may be executed by a component on the operating system 154. In some examples, the data transfer event 133 includes a copy-paste event. As such, in some examples, a system may encounter a technical problem of enforcing a restriction 111 to a computer function 126 that is executed by one or more applications 142 (e.g., a web browser) and one or more components (e.g., a clipboard manager, a window manager, etc.) on the operating system 154. Furthermore, when a copy request 133a is detected, the destination location 174b is not yet known, so it is unclear whether that content would be restricted from being transferred. The DLP system 100 provides a technical solution in which clipboard data 180 is encrypted in response to detection of a copy request 133a from application 142-1 (where the copy request includes controlled content as identified by a source location 172b of a DLP control 118) and stores the encryption key in the memory device 158. The clipboard data 180 is transferred from the application 142-1 to a computer clipboard 190 of the operating system 154, where clipboard data 180 includes encrypted content 186, the source location 172a and an encryption key identifier 184 that enables retrieval of (e.g., identifies the location) of the encryption key 192. Upon detection of a paste request 133b, the enforcement engine 130 can detect the destination location 174b and determine whether the restriction 111 to the clipboard function 138 is disabled/enabled. If enabled, the enforcement engine 130 may retrieve the encryption key 192 from the memory device 158 using the encryption key identifier 184, decrypt the encrypted content 186 using the encryption key 192, where the content is transferred to application 142-2.

In further detail, referring to FIG. 1G, in operation 171, the enforcement engine 130 may detect a copy request 133a. The enforcement engine 130 may derive a source location 172a from the copy request 133a. In this example, the source location 172a is application 142-1. In operation 173, the enforcement engine 130 may determine whether to apply a data transfer restriction to the copy request 133a. For example, the enforcement engine 130 may determine whether any of the DLP controls 118 apply to the application 142-1. If the DLP control 118 identifies a group resource identifier 113 as the source location 172b, the enforcement engine 130 may use the group resource identifier 113 to identify the application identifiers 115 associated with the application group 125. If one of the application identifiers 115 does not correspond to an application identifier 115-1 of the application 142-1, the enforcement engine 130 may that the DLP control 118 does not apply, and the content subject to the copy request 133a is not encrypted. If one of the application identifiers 115 corresponds to an application identifier 115-1 of the application 142-1, the enforcement engine 130 may that the DLP control 118 does apply to the content subject to the copy request 133a.

In operation 175, the enforcement engine 130 encrypts the content subject to the copy request 133a using an encryption key 192. In operation 177, the enforcement engine 130 stores the encryption key 192 in the memory device 158. In operation 179, the enforcement engine 130 generates a unique key (e.g., encryption key identifier 184) that enables retrieval of the encryption key 192 from the memory device 158. In operation 181, the enforcement engine 130 generates clipboard data 180 that is transferred to the computer clipboard 190 of the operating system 154. The clipboard data 180 may include a clipboard format 182 (e.g., a custom clipboard format). The clipboard format 182 may define the types of information that is included in the clipboard data 180. In some examples, the clipboard data 180 includes the source location 172a (e.g., the application identifier 115-1 of the application 142-1), the encryption key identifier 184, the encrypted content 186, and a text field 188. The text field 188 may provide information that is included within a UI object (e.g., indicating that the data transfer is blocked) which is displayed on the computing device 152 if the copy/paste operation is blocked.

Referring to FIG. 1H, in operation 183, the enforcement engine 130 detects a paste request 133b. In response to the paste request 133b, in operation 185, the enforcement engine 130 obtains the clipboard data 180 from the computer clipboard 190. As indicated above, the clipboard data 180 includes the source location 172a, the encryption key identifier 184, the encrypted content 186, and the text field 188. In operation 187, the enforcement engine 130 may retrieve the encryption key 192 from the memory device 158 using the encryption key identifier 184. In operation 189, the enforcement engine 130 may determine whether to allow the paste request 133b. For example, the enforcement engine 130 may derive the destination location 174a from the paste request 133b (e.g., application 142-2). The enforcement engine 130 may determine whether any of the DLP controls 118 apply to the source location 172a and the destination location 174a of the copy request 133a and the paste request 133b. In some examples, if the application 142-2 is part of the same application group 125 as the application 142-1, the enforcement engine 130 may determine that the paste request is allowed. In operation 191, the enforcement engine 130 decrypts the encrypted content 186 using the encryption key and provides the content to application 142-1. In some examples, if the application 142-2 is part of a different application group 125 from the application 142-1, the enforcement engine 130 may determine that the paste request is not allowed. In operation 193, the enforcement engine 130 may provide the text in the text field 188 in a UI object that is rendered to the user, which indicates that the paste operation is not allowed. As will be appreciated, in some examples, the encryption key identifier 184 may be retrieved (e.g., in operation 187) after having determined to allow the paste request (e.g., in operation 189).

In some examples, instead of using encryption/decryption techniques, the data 147 that is subject to the copy request 133a is stored in the memory device 158 (e.g., unencrypted data), and a data identifier 137 is generated, which is used to retrieve the data 147 from the memory device 158 (e.g., identify the location of the data 147 within the memory device 158). The data identifier 137 may be similar to the encryption key identifier 184, except that the data identifier 137 is used to enable retrieval of the data 147 that is stored in the memory device 158. The clipboard data 180 may include the source location 172a, the data identifier 137, and, in some examples, the text field 188.

Then, the enforcement engine 130 may derive the destination location 174a from the paste request 133b (e.g., application 142-2). The enforcement engine 130 may determine whether any of the DLP controls 118 apply to the source location 172a and the destination location 174a of the copy request 133a and the paste request 133b. In some examples, if the application 142-2 is part of the same application group 125 as the application 142-1, the enforcement engine 130 may determine that the paste request is allowed. The enforcement engine 130 may retrieve the data 147 from the memory device 158 using the data identifier 137. In some examples, if the application 142-2 is part of a different application group 125 from the application 142-1, the enforcement engine 130 may determine that the paste request is not allowed. The enforcement engine 130 may provide the text in the text field 188 in a UI object that is rendered to the user, which indicates that the paste operation is not allowed.

Figure 1I:
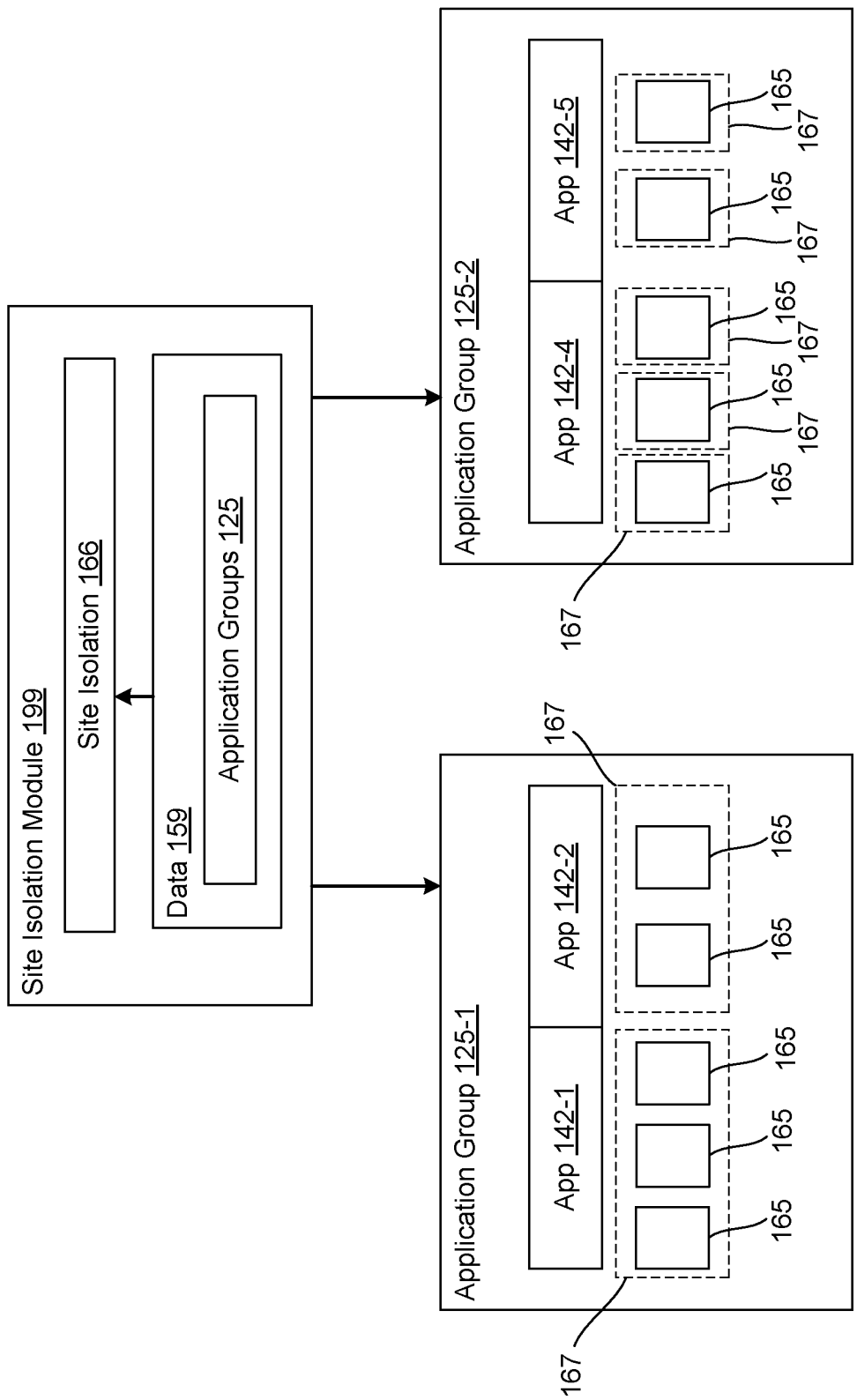
FIG. 1I illustrates an example of site isolation control for application groups according to an aspect.

Referring to FIGS. 1A and 1I, in some examples, the server computer 102 includes a site isolation module 199. The site isolation module 199 may enable site isolation 166 to provide an additional layer of security. When site isolation 166 is enabled, each website 165 loads and executes in a separate process 167, which makes it harder for malicious sites to bypass security measures that exist to prevent data theft. Site isolation 166 locks each process 167 (e.g., renderer process) to documents within a single site and filters certain cross-site data from each process. Site isolation 166 can block the processes from receiving certain types of sensitive data from other sites and a malicious website will find it more difficult to steal data from other sites. In some examples, when site isolation 166 is not enabled, multiple websites (or browser tabs) may share a common process, which decreases the amount of computing resources (e.g., CPU, memory) that are used and duplicate tasks are avoided. However, when site isolation 166 is enabled, an additional layer of security is provided, but the amount of computing resources is increased since each website 165 is launched and executed in a separate process 167.

In some examples, the site isolation module 199 may receive information about the application groups 125 and enable or disable site isolation 166 for applications 142 of a particular application group 125 based on the level of the group's level of trust. As such, the DLP system 100 may provide a technical benefit of reducing computing resources for applications of a trusted group but increasing the security for application of an untrusted group. For example, the application group 125-1 may include applications 142 (e.g., application 142-1, application 142-2) that already have good security measures, and the application group 125-1 is defined so that data can be transferred freely among the applications 142 of the application group 125-1, but data is restricted from being transferred out of the application group 125-1. In some examples, the site isolation module 199 may determine to not enable site isolation 166 for the applications 142 of the application group 125-1.

As shown in FIG. 1I, a common process 167 can launch and execute multiple websites (at the same time) from the application 142-1, and a common process 167 can launch and execute multiple websites (at the same time) from the application 142-2. In contrast, application group 125-2 may be an untrusted group (e.g., a collection of gambling applications, or personal applications that use the open web, etc.). In some examples, the application group 125-1 may be blocked or restricted from receiving data from the application group 125-2. As shown in FIG. 1I, the site isolation module 199 may determine to enable site isolation 166 for the applications 142 (e.g., application 142-4, application 142-5) of the application group 125-2. As shown in FIG. 1I, a separate process 167 launches and executes each website 165 from the application 142-4 and a separate process 167 launches and executes each website 165 from the application 142-5.

The site isolation module 199 may determine whether to enable or disable site isolation 166 for a particular application group 125 based on the application identifiers 115 of the application group 125, whether the application group 125 is associated with an identity 119, the data transfer properties 157, the extension data 121, and/or the device permission data 153. For example, using the application identifiers 115, the site isolation module 199 may determine that the applications 142 of a particular application group 125 have one or more security features that would not need site isolation 166. In some examples, if the identity 119 is associated with an application group 125, and the user that signs into the computing device 152 corresponds to the identity 119, the site isolation module 199 may disable site isolation 166 for the application group 125. However, if the user that signs into the computing device is different from the identity 119, the site isolation module 199 may enable site isolation 166 for the application group 125. In some examples, if the DLP controls 118 and/or the data transfer properties 157 indicate that a certain application group 125 is usually restricted from transferring data, the site isolation module 199 may enable site isolation 166 for the application group 125.

The computing device 152 may be any type of computing device that includes one or more processors 156, one or more memory devices 158, and an operating system 154 configured to execute (or assist with executing) one or more applications 142. In some examples, the computing device 152 includes a display 148. In some examples, the computing device 152 does not include a display 148. In some examples, the computing device 152 is a laptop or desktop computer. In some examples, the computing device 152 is a tablet computer. In some examples, the computing device 152 is a smartphone. In some examples, the computing device 152 is a wearable device. The display 148 is the display of the computing device 152. The display 148 may also include one or more external monitors that are connected to the computing device 152.

The operating system 154 is a system software that manages computer hardware, software resources, and provides common services for computing programs. In some examples, the operating system 154 is an operating system designed for a larger display 148 such as a laptop or desktop (e.g., sometimes referred to as a desktop operating system). In some examples, the operating system 154 is an operating system for a smaller display 148 such as a tablet or a smartphone (e.g., sometimes referred to as a mobile operating system).

The processor(s) 156 may be formed in a substrate configured to execute one or more machine executable instructions or pieces of software, firmware, or a combination thereof. The processor(s) 156 can be semiconductor-based—that is, the processors can include semiconductor material that can perform digital logic. The memory device(s) 158 may include a main memory that stores information in a format that can be read and/or executed by the processor(s) 156. The memory device(s) 158 may include one or more random-access memory (RAM) devices and/or one or more read-only memory (ROM) devices. The memory device(s) 158 may store applications (e.g., the operating system 154, applications 142, etc.) and modules (e.g., enforcement engine 130, content analyzer 108) that, when executed by the processors 156, perform certain operations.

The computing device 132 may be an example of the computing device 152 and may include any of the features discussed with reference to the computing device 152. For example, the computing device 132 may be a laptop or a desktop computer. In some examples, the computing device 132 may be a tablet or a smartphone. The computing device 132 may include one or more processors 139 and one or more memory devices 129. In some examples, the computing device 132 is associated with an administrator of an organization. For example, the administrator may be associated with an organization that owns or manages the computing device 152. For example, the computing device 152 (and the computing device 132) may be an enterprise-owned computing device such as a work computer owned or managed by the user's company or a school computer owned or managed by the user's school.

The computing device 152 (and the computing device 132) may communicate with the server computer 102 over the network 150. The server computer 102 may be computing devices that take the form of a number of different devices, for example a standard server, a group of such servers, or a rack server system. In some examples, the server computer 102 may be a single system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections.

The server computer 102 may include one or more processors 104 formed in a substrate, an operating system (not shown) and one or more memory devices 106. The memory devices 106 may represent any kind of (or multiple kinds of) memory (e.g., RAM, flash, cache, disk, tape, etc.). In some examples (not shown), the memory devices 106 may include external storage, e.g., memory physically remote from but accessible by the server computer 102. The server computer 102 may include one or more modules or engines representing specially programmed software.

A ML model 110 is a predictive model. In some examples, a ML model 110 includes a neural network. The ML model 110 may be an interconnected group of nodes, each node representing an artificial neuron. The nodes are connected to each other in layers, with the output of one layer becoming the input of a next layer. The ML model 110 transforms an input, received by the input layer, transforms it through a series of hidden layers, and produces an output via the output layer. Each layer is made up of a subset of the set of nodes. The nodes in hidden layers are fully connected to all nodes in the previous layer and provide their output to all nodes in the next layer. The nodes in a single layer function independently of each other (i.e., do not share connections). Nodes in the output provide the transformed input to the requesting process. In some examples, the ML model 110 is a convolutional neural network, which is a neural network that is not fully connected. Convolutional neural networks therefore have less complexity than fully connected neural networks. Convolutional neural networks can also make use of pooling or max-pooling to reduce the dimensionality (and hence complexity) of the data that flows through the neural network and thus this can reduce the level of computation required. This makes computation of the output in a convolutional neural network faster than in neural networks.

The ML model 110 includes a set of computational processes for receiving a set of inputs (e.g., input values) and generating one or more outputs (e.g., output values). In some examples, the output value(s) may represent whether the content includes restricted content. The plurality of layers may include an input layer, one or more hidden layers, and an output layer. In some examples, one or more of the outputs the output layer represents a possible prediction (e.g., whether the data includes restricted content). In some examples, the output of the output layer with the highest value represents the prediction.

In some examples, the ML model 110 is a deep neural network (DNN). For example, a deep neural network (DNN) may have one or more hidden layers disposed between the input layer and the output layer. However, the ML model 110 may be any type of artificial neural network (ANN) including a convolution neural network (CNN). The neurons in one layer are connected to the neurons in another layer via synapses. Each synapse is associated with a weight. A weight is a parameter within the ML model 110 that transforms input data within the hidden layers. As an input enters the neuron, the input is multiplied by a weight value and the resulting output is either observed or passed to the next layer in the ML model 110. For example, each neuron has a value corresponding to the neuron's activity (e.g., activation value). The activation value can be, for example, a value between 0 and 1 or a value between −1 and +1. The value for each neuron is determined by the collection of synapses that couple each neuron to other neurons in a previous layer. The value for a given neuron is related to an accumulated, weighted sum of all neurons in a previous layer. In other words, the value of each neuron in a first layer is multiplied by a corresponding weight and these values are summed together to compute the activation value of a neuron in a second layer. Additionally, a bias may be added to the sum to adjust an overall activity of a neuron. Further, the sum including the bias may be applied to an activation function, which maps the sum to a range (e.g., zero to 1). Possible activation functions may include (but are not limited to) rectified linear unit (ReLu), sigmoid, or hyperbolic tangent (TanH).

Figure 2:
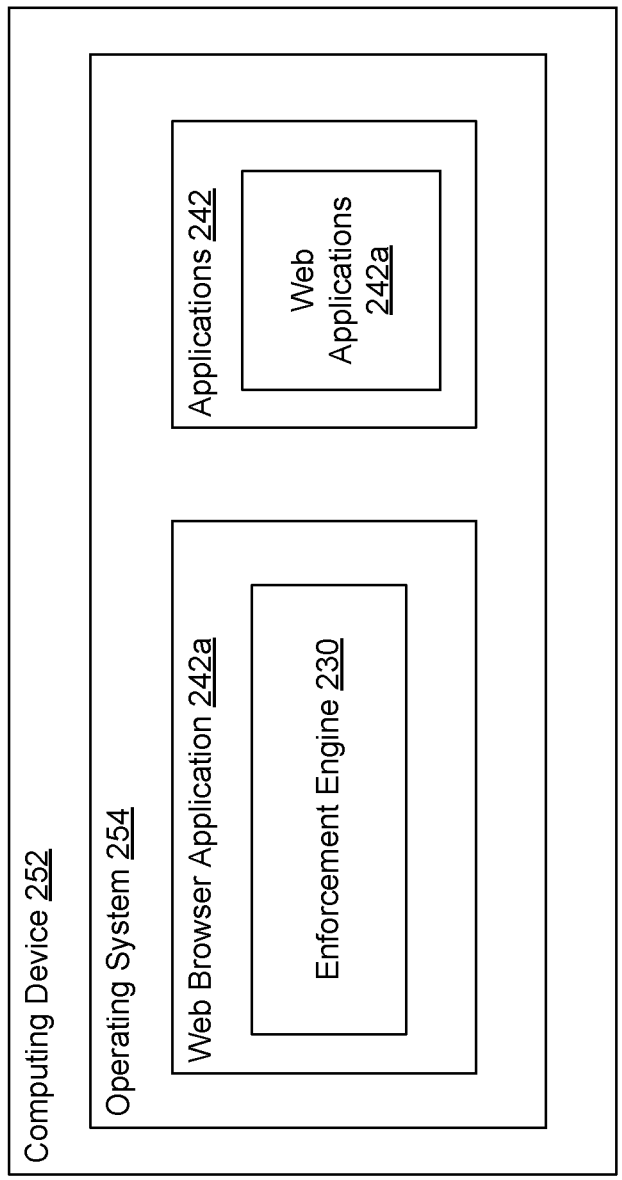
FIG. 2 illustrates an example of an enforcement engine executable by a web browser application according to an aspect.

FIG. 2 illustrates an example of a computing device 252 having an enforcement engine 230 according to an aspect. In the example of FIG. 2, the enforcement engine 230 is executable by a web browser application 242a that operates on an operating system 254 of the computing device 252. In some examples, the web browser application 242a is configured to execute web applications 242a, which may be one of the applications 242 executable by the computing device 252. A web browser application 242 is a software program that allows a user to locate, access, and display web pages in browser windows and browser tabs. In some examples, the application groups (e.g., the application groups 125 of FIGS. 1A through 1I) may include different groups of web applications 242a that are executable (at least in part) by the web browser application 242a. The computing device 252 may be an example of the computing device 152 of FIGS. 1A through 1I and may include any of the details explained with reference to those figures. In some examples, the web browser application 242a includes the enforcement engine 230, where the web browser application 242a is configured to execute any of the functionalities of the enforcement engine 230. The enforcement engine 230 is an example of the enforcement engine 130 of FIGS. 1A through 1I and may include any of the details discussed with reference to those figures.

Figure 3A:
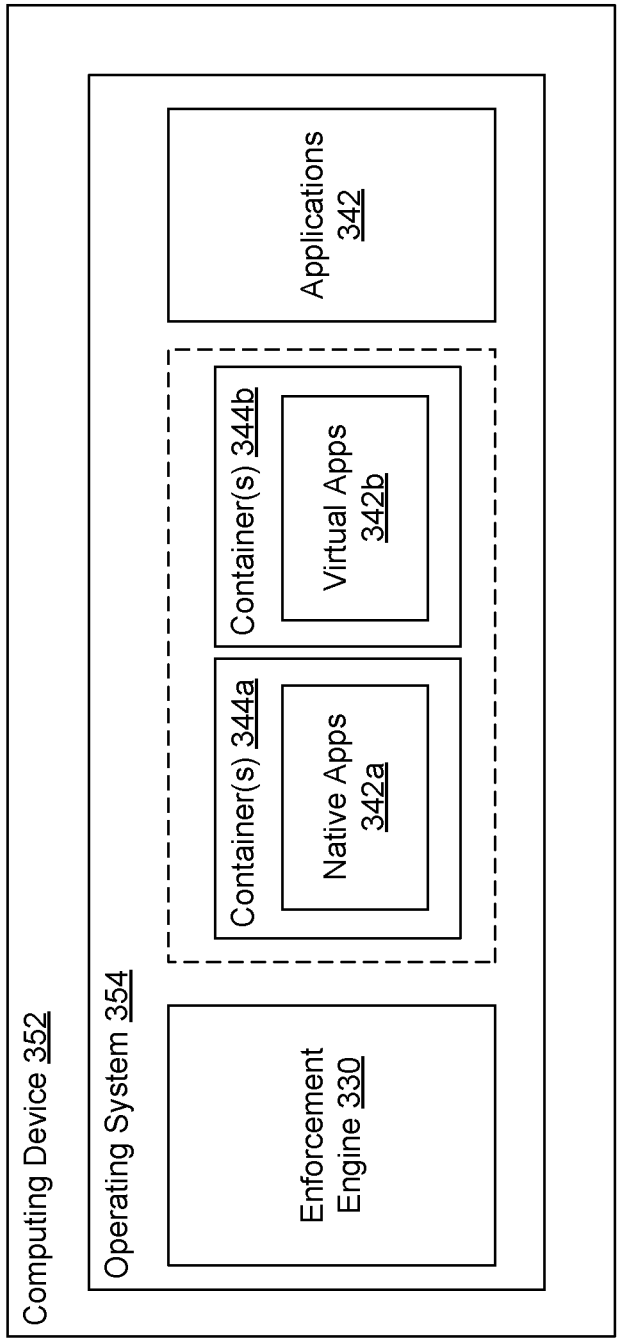
FIG. 3A illustrates an example of an enforcement engine executable by an operating system of a computing device according to an aspect.
Figure 3B:
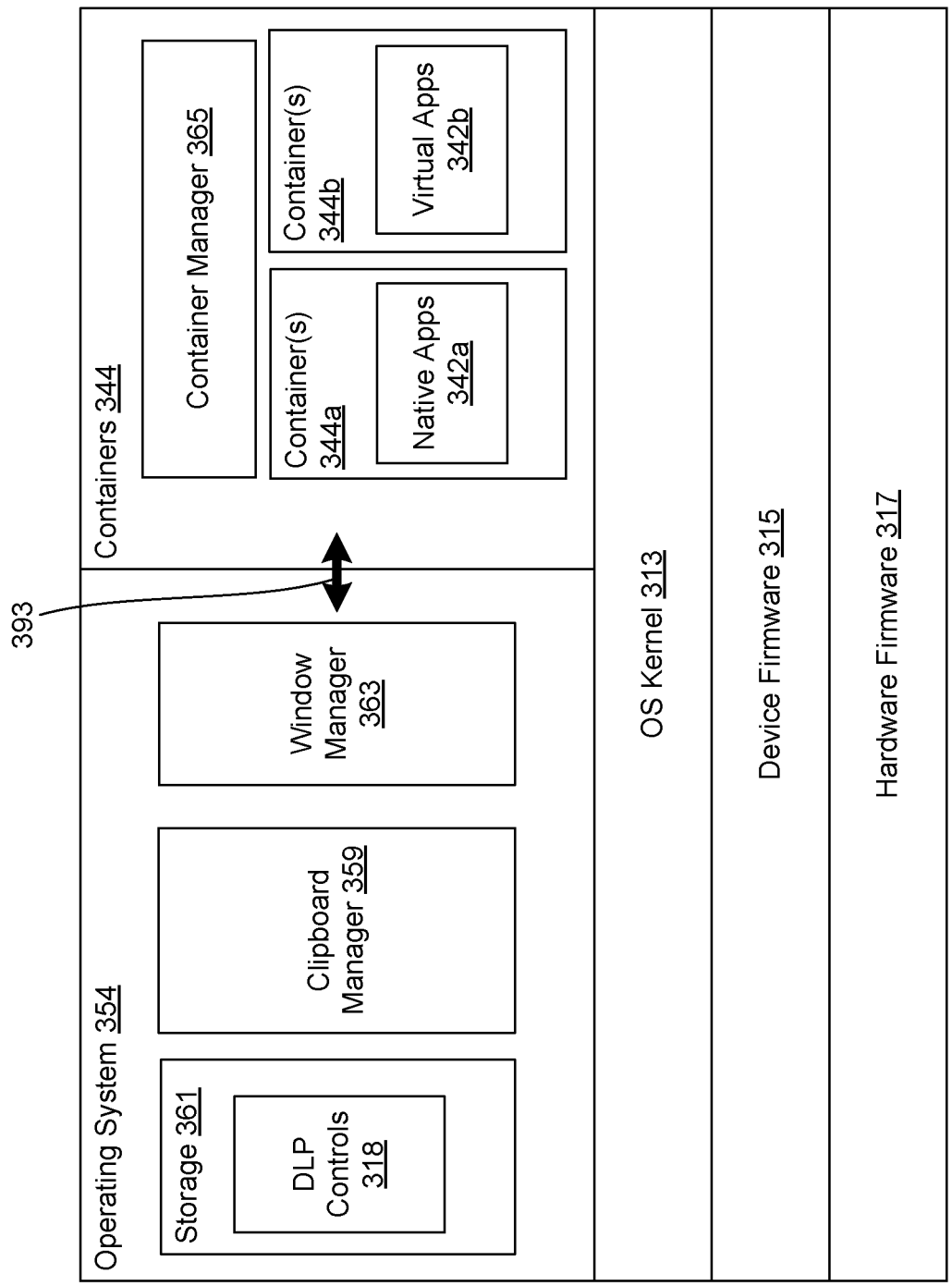
FIG. 3B illustrates an example of an operating system having an enforcement engine according to an aspect.

FIGS. 3A and 3B illustrate an example of a computing device 352 having an enforcement engine 330 according to an aspect. In the example of FIGS. 3A and 3B, the enforcement engine 330 is executable by an operating system 354 of a computing device 352. The operating system 354 may include a storage 361, a clipboard manager 359, and a window manager 363. The storage 361 may store the DLP controls 318. The operating system 354 may include one or more software containers 344 and a container manager 365 configured to manage system operations of the software containers 344. In some examples, instead of using a software container 344, the operating system 354 defines a virtual machine that is configured to launch and execute the applications 342. The window manager 363, the clipboard manager 359, and the storage 361 may communicate with the container manager 365 and the containers 344 via an inter-process communication (IPC) link 393.

In some examples, the software containers 344 include one or more containers 344a configured to launch and execute native applications 342a and one or more software containers 344b configured to launch and execute one or more virtual applications 342b. A software container 344 may be an instance of another operating system. In some examples, the software container 344a (or virtual machine) shares an OS kernel 313 with the operating system 354. In some examples, the software container 344b (or virtual machine) shares an OS kernel 313 with the operating system 354. In some examples, the software container 344a and the software container 344b share the same OS kernel 313. In some examples, the software container 344a, the software container 344b, and the operating system 354 do not share an OS kernel 313 with each other. The OS kernel 313 is the primary interface between the hardware and the processes of a computing device. The OS kernel 313 is an initial program that is loaded into memory before the boot loader. The OS kernel 313 may operate on device firmware 315, which operates on hardware firmware 317. A software container 344 (or virtual machine) may be a runtime platform that includes software dependencies required by the applications that it launches and executes, such as specific versions of programming language runtimes and other software libraries that assist with executing the applications.

In some examples, the container manager 365 is configured to intercept a data transfer event (e.g., the data transfer event 133 of FIG. 1B) generated by one of the software containers 344 and extract content metadata from the data transfer event. The extracted content metadata may identify a source and/or destination of the content. In some examples, the container manager 365 may receive the DLP controls 318 via the IPC link 393 and determine whether the source and/or destination of the content corresponds to one of the sources and/or destinations identified by the DLP controls 318. In some examples, the container manager 365 may transmit the extracted metadata to the operating system 354 via the IPC link 393, where the operating system 354 determines whether the source and/or destination of the content corresponds to one of the sources and/or destinations identified by the DLP controls 318.

In some examples, the operating system 354 is configured to intercept a data transfer event transmitted via the IPC link, extract content metadata, and determine whether the source and/or destination of the content corresponds to one of the sources and/or destinations identified by the DLP controls 318. In some examples, the OS kernel 313 is configured to intercept a data transfer event generated by the operating system 354 and/or the containers 344, extract content metadata, and determine whether the source and/or destination of the content corresponds to one of the sources and/or destinations identified by the DLP controls 318.

In some examples, the window manager 363 is configured to detect a data transfer event involving on-screen content and extract content metadata from the display event. In some examples, the data transfer event is generated by one of the software containers (e.g., container 344a or container 344b) when display content to be rendered has changed and received by the window manager 363 via the IPC link 393. The extracted content metadata may identify a source of the on-screen content. The window manager 363 may determine whether the source of the on-screen content extracted from the content metadata correspond to (e.g., matches) the source identified by the DLP controls 318. In some examples, the container manager 365 is configured to detect a display event involving on-screen content and extract content metadata from the display event. In some examples, the display event is generated by one of the software containers (e.g., container 344*a* or container 344*b*) when display content to be rendered has changed. The extracted content metadata may identify a source of the on-screen content. The container manager 365 may determine whether the source of the on-screen content extracted from the content metadata correspond to (e.g., matches) the source identified by the DLP controls 318.

In some examples, the clipboard manager 359 is configured to detect a clipboard request that identifies a source and/or destination of content to be copied, cut, or pasted. The clipboard manager 359 may obtain the clipboard request and extract content metadata about the source and/or destination of the content to be copied, cut, or pasted. The clipboard manager 359 may detect that the source and/or destination of the content extracted from the content metadata corresponds to (e.g., matches) the source and/or the destination of the DLP control 318.

Figure 4:
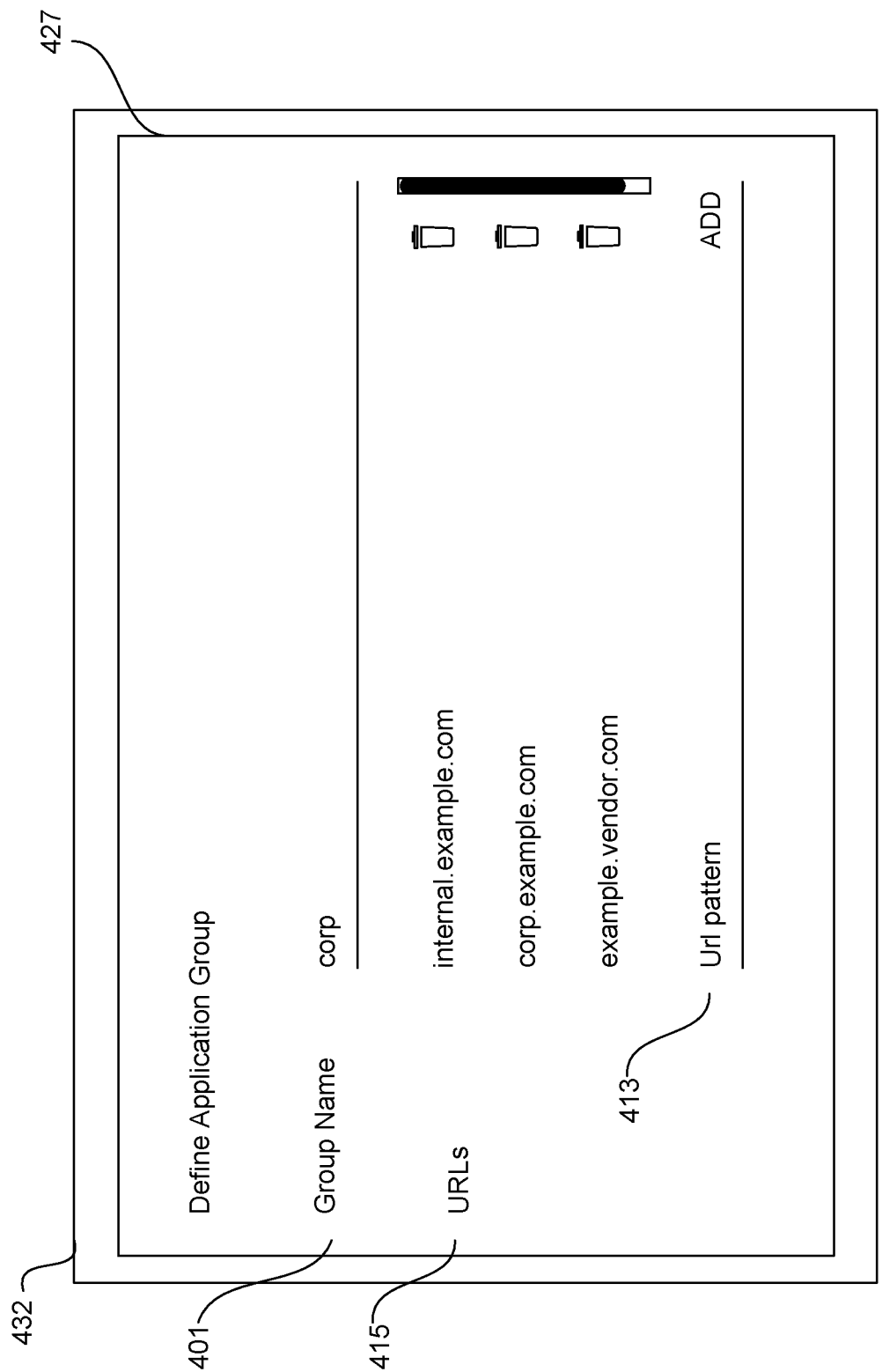
FIG. 4 illustrates an example of an administrator user interface for defining an application group according to an aspect.

FIG. 4 illustrates an example of a DLP interface 427 for a DLP application on a computing device 432 associated with an administrator of an organization. For example, the administrator may define a group name 401 for the application group and identify application identifiers 415 that belong to the application group. In some examples, the administrator may define a URL pattern for a group resource identifier 413. In some examples, the URL pattern for the group resource identifier 413 is automatically generated.

Figure 5A:
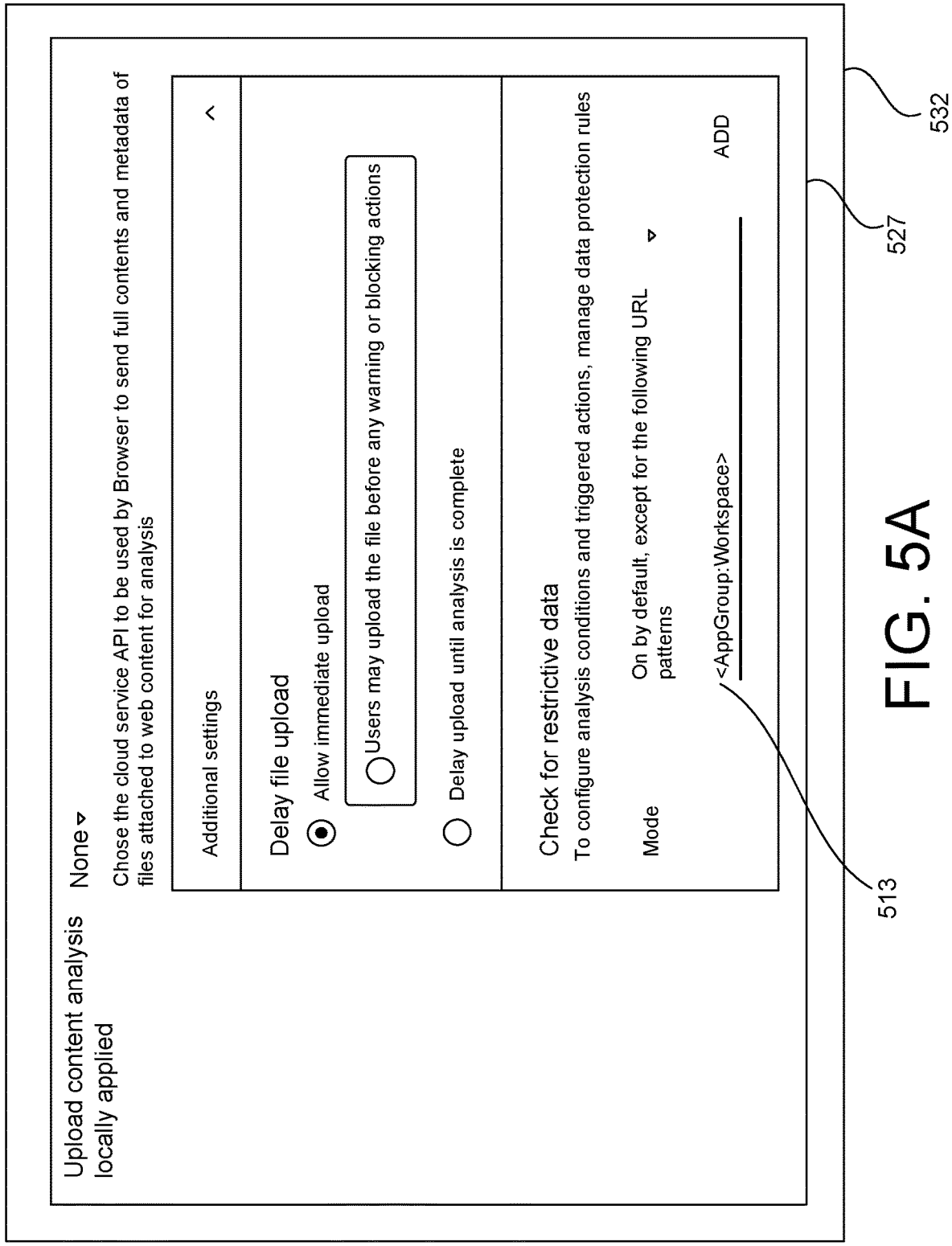
FIG. 5A illustrates an example of an administrator user interface for a data transfer restriction involving an application group according to an aspect.
Figure 5B:
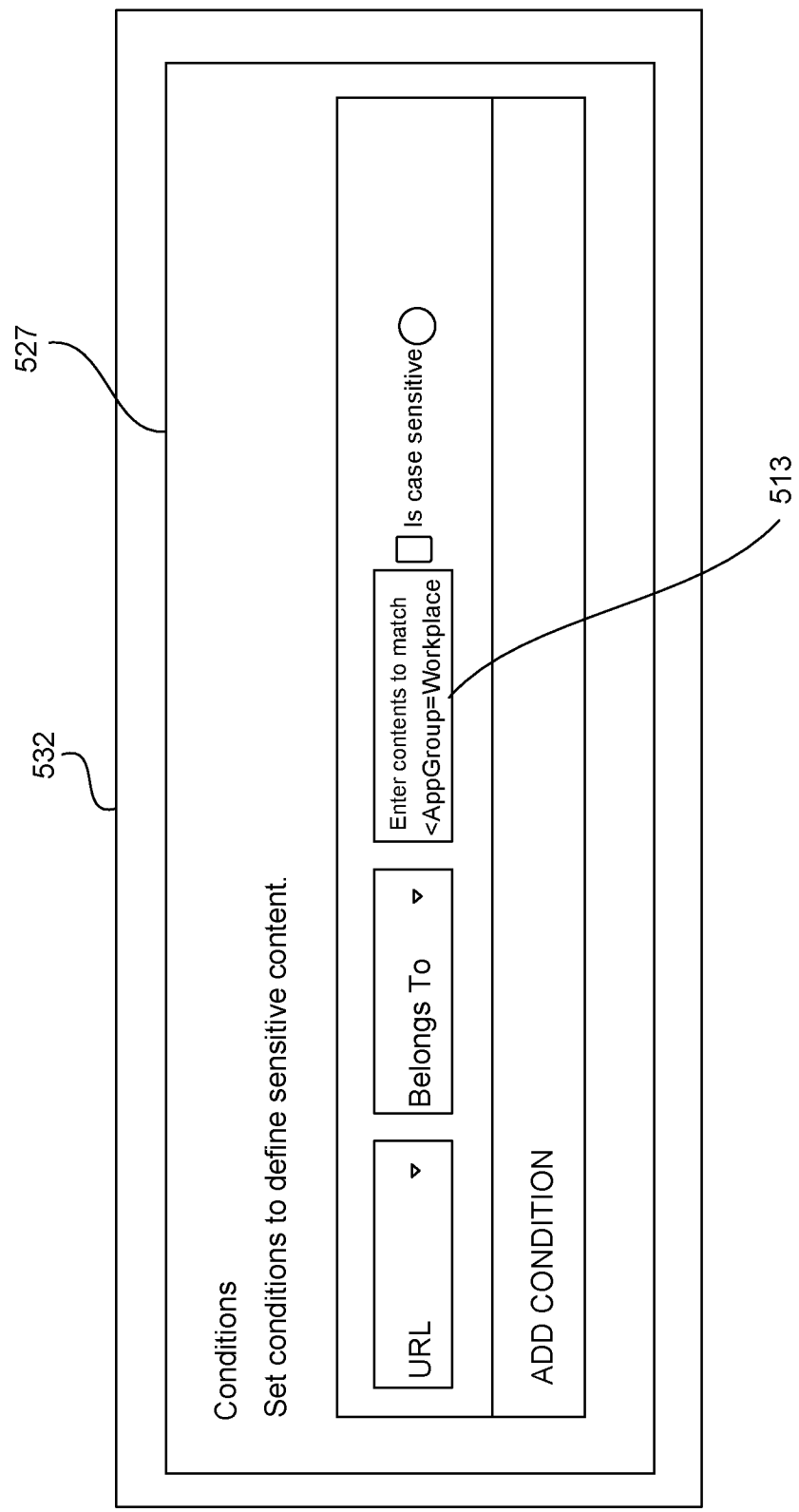
FIG. 5B illustrates an example of an administrator user interface for a data transfer restriction involving an application group according to another aspect.

FIGS. 5A and 5B illustrate examples of a DLP interface 527 for a DLP application on a computing device 532 associated with an administrator of an organization. For example, the administrator may add a group resource identifier 513 to a restriction that checks for restrictive content (e.g., triggers a data scan) if a data transfer event involves data from any application that belongs to the application group identified by the group resource identifier 513.

Figure 6:
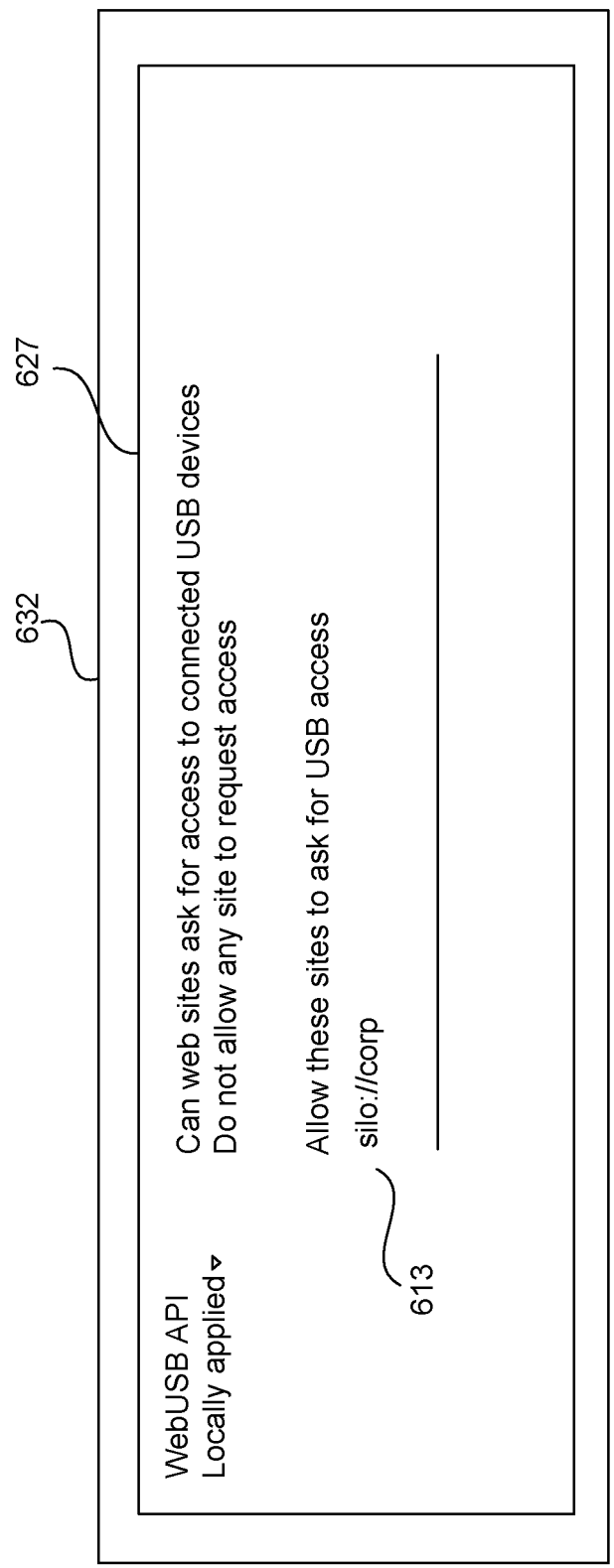
FIG. 6 illustrates an example of an administrator user interface for a data transfer restriction involving an application group according to another aspect.

FIG. 6 illustrates an example of a DLP interface 627 for a DLP application on a computing device 632 associated with an administrator of an organization. For example, the administrator may be able to add a group resource identifier 613 to restrict access (e.g., disable a permission) for any of the applications of the application group identified by the group resource identifier 613.

Figure 7:
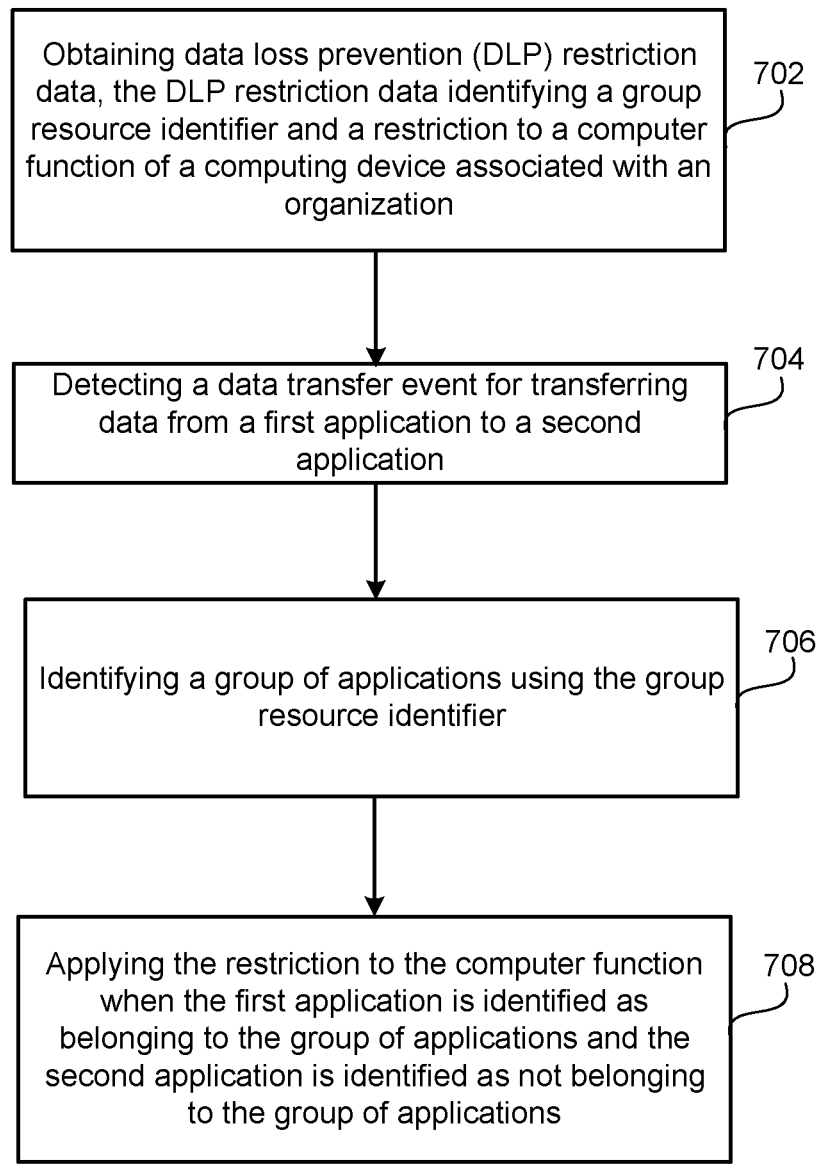
FIG. 7 illustrates a flowchart depicting example operations of a data loss prevention system according to an aspect.

FIG. 7 illustrates a flowchart 700 depicting example operations of a DLP system according to an aspect. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion. The operations may define a computer-implemented method. Although the flowchart 700 is described with reference to the DLP system 100 of FIGS. 1A through 1I, the flowchart 700 may be executed according to any of the figures discussed herein.

The operations of the flowchart 700 may be performed by any of the computing devices discussed herein, including computing device 152. Operation 702 includes obtaining data loss prevention (DLP) restriction data 116, where the DLP restriction data 116 identifies a group resource identifier 113 and a restriction to a computer function of a computing device 152 associated with an organization. Operation 704 includes detecting a data transfer event 133 for transferring data from a first application to a second application. Operation 706 includes identifying a group 125 of applications using the group resource identifier 113. Operation 708 includes applying the restriction to the computer function when the first application is identified as belonging to the group of applications and the second application is identified as not belonging to the group of applications.

According to some aspects, the operations may include detecting a copy request from the first application, encrypting the data using an encryption key, storing the encryption key in a memory device and generating clipboard data including an encryption key identifier and the encrypted data. In some examples, the operations may include detecting a paste request from the second application, retrieving the encryption key from the memory device using the encryption key identifier, determining whether to apply the restriction to the computer function, and decrypting, in response to determining not to apply the restriction to the computer function, the encrypted data using the encryption key. The operations may include not applying the restriction to the computer function when the first and second applications are identified as belonging to the group of applications. The restriction to the computer function may include blocking transfer of the data from the first application to the second application. The restriction to the computer function may include triggering a data scan to detect restricted content from the data that is subject to the data transfer event. The operations may include transmitting, in response to the data scan being triggered, the data that is subject to the data transfer event to a server computer, receiving an indication that the data contains the restricted content, and blocking transfer of the data from the first application to the second application. The restriction to the computer function may include triggering a selectable user interface (UI) object that warns a user about a transfer of the data from the first application to the second application, wherein, in response to receipt of a selection of the selectable UI object, permitting the transfer of the data from the first application to the second application. The restriction to the computer function may include a restriction to a printing function. The group resource identifier may include a resource locator pattern. The group of applications is associated with a user identity, and the operations may include determining whether an authentication credential of a user of the computing device corresponds to the user identity, and in response to the authentication credential of the user not corresponding to the user identity and applying the restriction to the computer function in response to identifying the first and second applications as belonging to the group of applications. The operations may include detecting a copy request from the first application, storing the data in a memory device, and generating clipboard data including a data identifier that identifies a location of the data in the memory device. The operations may include detecting a paste request from the second application, determining whether to apply the restriction to the computer function, and retrieving the data from the memory device using the data identifier in response to determining not to apply the restriction to the computer function.

According to an aspect, an apparatus comprising at least one processor and a non-transitory computer readable medium storing executable instructions that when executed by the at least one processor cause the at least one processor to obtain data loss prevention (DLP) restriction data, the DLP restriction data identifying a first group resource identifier, a second group resource identifier, and a restriction to a computer function of a computing device associated with an organization, detect a data transfer event for transferring data from a first application to a second application, identify a first group of applications using the first group resource identifier, identify a second group of applications using the second group resource identifier, and apply the restriction to the computer function in response to the first application being identified as belonging to the first group of applications and the second application being identified as belonging to the second group of applications.

According to some aspects, the executable instructions include that cause the at least one processor to receive a request to add an extension to the first application, obtain extension data associated with the first group of applications using the first group resource identifier, the extension data indicating that the extension is disabled for any application of the first group of applications, and restrict installation of the extension in response to the first application being identified as belonging to the first group of applications. The executable instructions include instructions that cause the at least one processor to obtain device permission data associated with the first group of applications using the first group resource identifier, the device permission data indicating that a device permission is disabled for any application of the first group of applications and disable the device permission for the first application in response to the first application being identified as belonging to the first group of applications. The executable instructions include instructions that cause the at least one processor to detect a copy request from the first application, encrypt the data using an encryption key, store the encryption key in a memory device, and generate clipboard data including an encryption key identifier and the encrypted data. The executable instructions include instructions that cause the at least one processor to detect a paste request from the second application and render a user interface (UI) object indicating that a clipboard function is blocked for transferring the data from the first application to the second application.

According to an aspect, a non-transitory computer-readable medium stores executable instructions that, when executed by at least one processor, cause the least one processor to execute operations. The operations include obtaining data loss prevention (DLP) restriction data, the DLP restriction data identifying a group resource identifier and a restriction to a computer function of a computing device associated with an organization, detecting a data transfer event for transferring data from a first application to a second application, identifying a group of applications using the group resource identifier, and applying the restriction to the computer function when the first application is identified as belonging to the group of applications and the second application is identified as not belonging to the group of applications. The operations may include detecting a copy request from the first application, encrypting the data using an encryption key, storing the encryption key in a memory device, and generating clipboard data including an encryption key identifier and the encrypted data. The operations may include detecting a paste request from the second application and rendering a user interface (UI) object indicating that a clipboard function is blocked for transferring the data from the first application to the second application. The group resource identifier includes a resource locator pattern.

In some examples, an apparatus includes at least one processor and a non-transitory computer readable medium storing executable instructions that when executed by the at least one processor cause the at least one processor to obtain data loss prevention (DLP) restriction data, the DLP restriction data identifying a group resource identifier and a restriction to a computer function of a computing device associated with an organization, detect a data transfer event for transferring data from a first application to a second application, identify a group of applications using the group resource identifier, and determine whether to apply the restriction to the computer function based on whether i) the first application is identified as belonging to the group of applications and the second application is identified as not belonging to the group of applications or ii) the first application and the second application are identified as belonging to the group of applications. In some examples, a method and/or computer-readable medium product is provided having the operations discussed above/below.

In some aspects, the executable instructions include instructions that cause the at least one processor to detect a copy request in respect of data from the first application, encrypt the data from the first application using an encryption key, store the encryption key in a memory device, and generate clipboard data including the encrypted data and an encryption key identifier, which enables retrieval of the encryption key from the memory device. The executable instructions include instructions that cause the at least one processor to detect a paste request from the second application, retrieve the encryption key from the memory device using the encryption key identifier, and decrypt, in response to determining not to apply the restriction to the computer function based on the first application and the second application being identified as belonging to the group of applications, the encrypted data using the encryption key. The executable instructions include instructions that cause the at least one processor to not apply the restriction to the computer function when the first application and the second application are identified as belonging to the group of applications and/or apply the restriction to the computer function when the first application is identified as belonging to the group of applications and the second application is identified as not belonging to the group of applications.

Figure 8:
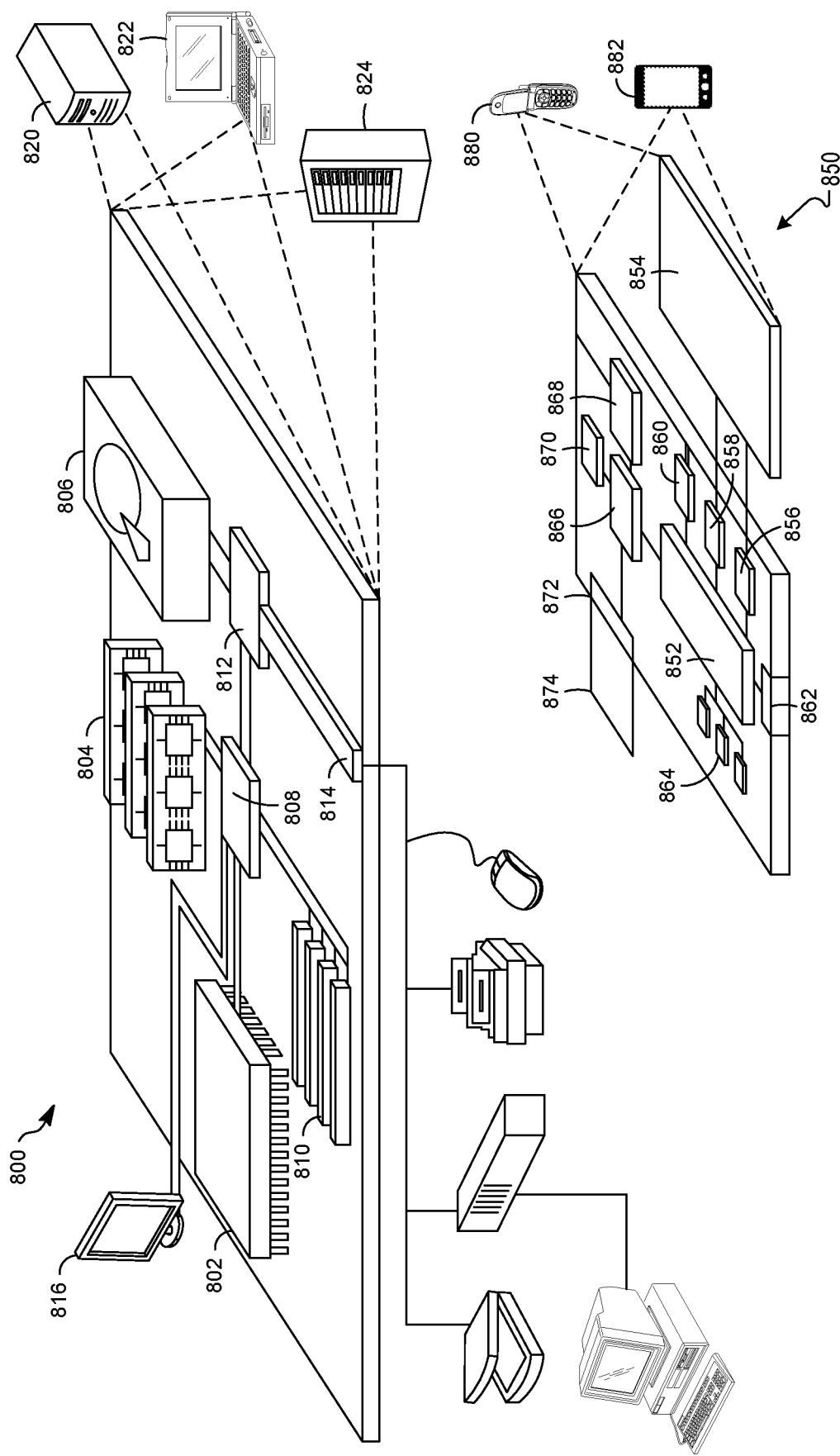
FIG. 8 is a block diagram showing example or representative computing devices and associated elements that may be used to implement the systems and methods discussed herein according to an aspect.

FIG. 8 shows an example of a computer device 800 and a mobile computer device 850, which may be used with the techniques described here. In some implementations, the computing device 152 of FIGS. 1A through 1I is an example of the computer device 800 or the mobile computer device 850. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions are examples only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more computing devices 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850 or may also store applications or other information for device 850. Specifically, expansion memory 874 may include instructions to carry out or supplement the processes described above and may include secure information also. Thus, for example, expansion memory 874 may be provided as a security module for device 850 and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or another similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or non-transitory medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A computer-implemented method comprising:
    detecting, from a first application, a copy request for copying controlled content, where the copy request is associated with a clipboard function;
    determining that the first application is included in a group of applications identified based on data loss prevention (DLP) restriction data, the DLP restriction data including a group resource identifier associated with the group of applications and a restriction to the clipboard function;

in response to determining that the first application is included in the group of applications:
triggering a data scan to detect restricted content in the controlled content,
in response to the data scan detecting restricted content in the controlled content,
encrypting the controlled content with an encryption key as encrypted content, and
transferring clipboard data to a buffer associated with the clipboard function, the clipboard data including the encrypted content;
detecting, from a second application, a paste request for pasting the controlled content, wherein the paste request is associated with the clipboard function;
determining that the second application is included in the group of applications; and
in response to determining that the second application is included in the group of applications:
retrieving the clipboard data from the buffer associated with the clipboard function,
retrieving the controlled content by decrypting the encrypted content with the encryption key, and
transferring the controlled content to the second application.

2. The computer-implemented method of claim 1, wherein the paste request is a first paste request, further comprising:
detecting, from a third application, a second paste request for pasting the controlled content;
determining that the third application is not included in the group of applications; and
in response to determining that the third application is not included in the group of applications applying the restriction by disabling to the clipboard function.

3. The computer-implemented method of claim 2, wherein disabling the clipboard function blocks a transfer of the controlled content from the first application to the third application by restricting access to the encryption key.

4. The computer-implemented method of claim 1, further comprising:
in response to the first application being determined as included in the group of applications storing the encryption key to a memory device, wherein the clipboard data includes an encryption key identifier associated with the encryption key and the memory device; and
in response to the second application being determined as included in the group of applications locating the encryption key in the memory device based on the encryption key identifier.

5. The computer-implemented method of claim 1, wherein the clipboard function is executed by a web browser and at least one component of an operating system.

6. The computer-implemented method of claim 5, wherein the at least one component of the operating system includes a clipboard manager or a window manager.

7. An apparatus comprising:
at least one processor; and
a non-transitory computer readable medium storing executable instructions that when executed by the at least one processor cause the at least one processor to:
detect, from a first application, a copy request for copying controlled content, wherein the copy request is associated with a clipboard function;
determine that the first application is included in a group of applications identified based on data loss prevention (DLP) restriction data, the DLP restriction data including a group resource identifier associated with the group of applications and a restriction to the clipboard function associated with the copy request;
encrypt the controlled content with an encryption key as encrypted content,
store the encryption key to a memory device,
transfer clipboard data to a buffer associated with the clipboard function, the clipboard data including the encrypted content and an encryption key identifier associated with the encryption key and the memory device;
detect, from a second application, a paste request for pasting the controlled content, wherein the paste request is associated with the clipboard function;
determine that the second application is included in the group of applications;
retrieve the clipboard data from the buffer associated with the clipboard function;
locate the encryption key in the memory device based on the encryption key identifier,
retrieve the controlled content by decrypting the encrypted content with the encryption key; and
transfer the controlled content to the second application.

8. The apparatus of claim 7, wherein the executable instructions include instructions that cause the at least one processor to:
receive a request to add an extension to the first application;
obtain extension data associated with the group of applications using the group resource identifier, the extension data indicating that the extension is disabled for any application of the group of applications; and
restrict installation of the extension in response to the first application being identified as belonging to the group of applications.

9. The apparatus of claim 7, wherein the executable instructions include instructions that cause the at least one processor to:
obtain device permission data associated with the group of applications using the group
resource identifier, the device permission data indicating that a device permission is
disabled for any application of the group of applications; and
disable the device permission for the first application in response to the first application being identified as belonging to the group of applications.

10. A non-transitory computer-readable medium storing executable instructions that, when executed by at least one processor, cause the at least one processor to execute operations, the operations comprising:
detecting, from a first application, a copy request for copying controlled content, wherein the copy request is associated with a clipboard function;
determining that the first application is included in a group of applications identified based on data loss prevention (DLP) restriction data, the DLP restriction data including a group resource identifier associated with the group of applications and a restriction to the clipboard function;
in response to determining that the first application being is included in the group of applications:

storing the controlled content to a memory device, and transferring clipboard data to a buffer associated with the clipboard function, the clipboard data including an identifier associated with the controlled content and the memory device;

detecting, from a second application, a paste request for pasting the controlled content, wherein the paste request is associated with the clipboard function;

determining that the second application is included in the group of applications; and in response to determining that the second application is included in the group of applications:

retrieving the clipboard data from the buffer associated with the clipboard function, locating the controlled content in the memory device based on the identifier, and transferring the controlled content to the second application.

11. An apparatus comprising:

at least one processor; and a non-transitory computer readable medium storing executable instructions that when executed by the at least one processor cause the at least one processor to:

detect, from a first application, a copy request for copying controlled content, wherein the copy request is associated with a clipboard function;

determine that the first application is included in a group of applications identified based on data loss prevention (DLP) restriction data, the DLP restriction data including a group resource identifier associated with the group of applications and a restriction to the clipboard function associated with the copy request;

store the controlled content to a memory device, transfer clipboard data to a buffer associated with the clipboard function, the clipboard data including an identifier associated with the controlled content and the memory device;

detect, from a second application, a paste request for pasting the controlled content, wherein the paste request is associated with the clipboard function;

determine that the second application is included in the group of applications;

retrieve the clipboard data from the buffer associated with the clipboard function, locate the controlled content in the memory device based on the identifier, and transfer the controlled content to the second application.

\* \* \* \* \*